(12) United States Patent
Ishibashi

(10) Patent No.: US 7,366,112 B2
(45) Date of Patent: Apr. 29, 2008

(54) COMMUNICATION NETWORK CONTROL SYSTEM, CONTROL METHOD, NODE AND PROGRAM

(75) Inventor: Osamu Ishibashi, Tokyo (JP)

(73) Assignee: NEC Corporation, Tokyo (JP)

( * ) Notice: Subject to any disclaimer, the term of this patent is extended or adjusted under 35 U.S.C. 154(b) by 980 days.

(21) Appl. No.: 10/408,090

(22) Filed: Apr. 8, 2003

(65) Prior Publication Data

US 2003/0193901 A1  Oct. 16, 2003

(30) Foreign Application Priority Data

Apr. 11, 2002  (JP)  ............................. 2002-108691

(51) Int. Cl.
    H04L 12/28  (2006.01)
(52) U.S. Cl. ....................... 370/255; 370/225; 370/235
(58) Field of Classification Search ................ 370/219, 370/220, 221
    See application file for complete search history.

(56) References Cited

U.S. PATENT DOCUMENTS

| | | | | |
|---|---|---|---|---|
| 5,687,168 | A * | 11/1997 | Iwata ......................... | 370/255 |
| 5,737,319 | A * | 4/1998 | Croslin et al. ............... | 370/255 |
| 6,026,077 | A * | 2/2000 | Iwata ......................... | 370/254 |
| 6,147,971 | A * | 11/2000 | Rochberger et al. ........ | 370/238 |
| 6,333,918 | B1 * | 12/2001 | Hummel ...................... | 370/238 |
| 6,370,119 | B1 * | 4/2002 | Basso et al. ................. | 370/252 |
| 6,385,201 | B1 * | 5/2002 | Iwata ......................... | 370/400 |
| 6,400,681 | B1 * | 6/2002 | Bertin et al. ................ | 370/218 |
| 6,456,600 | B1 * | 9/2002 | Rochberger et al. ........ | 370/255 |
| 6,564,258 | B1 * | 5/2003 | Uniacke ...................... | 709/223 |
| 6,886,043 | B1 * | 4/2005 | Mauger et al. ............. | 709/238 |
| 7,197,546 | B1 * | 3/2007 | Bagga et al. ................ | 709/223 |
| 2001/0033550 | A1 * | 10/2001 | Banwell et al. ............. | 370/254 |
| 2001/0042131 | A1 * | 11/2001 | Mathon et al. ............. | 709/238 |

FOREIGN PATENT DOCUMENTS

JP  11-177562  7/1999

OTHER PUBLICATIONS

BanerJee, A. et al., Generalized Multiprotocol Label Switching: An Overview of Signaling Enhancements and Recovery Techniques, IEEE Communication Magazine, Jul. 2001, vol. 39, pp. 144-151.
Kompella, K. et al., OSPF Extensions in Support of Generalized MPLS, Internet Draft, Feb. 2000, draft-ietf-ccamp-ospf-gmpls-extensions-04.txt.
Kameya, Eiko-; Serial publication; Introduction to IP routing; 5th OSPF Resistance to large scale transport in a complex network.; Mar. 28, 2002, URL, http://www.atmarkit.co.jp/fnetwork/rensai/iprt05/iprt01.html.

(Continued)

*Primary Examiner*—Chi Pham
*Assistant Examiner*—Kevin Mew
(74) *Attorney, Agent, or Firm*—Young & Thompson

(57) ABSTRACT

In the communication network system, when transferring communication data from a transmission source node to a destination node by using a first path, at the time of selecting a route to the destination node by the transmission source node, a data base covering all the links of different attributes is set up to generate information of a route whose metric (cost) is the minimum and in which information a link attribute is described by using the data base.

12 Claims, 19 Drawing Sheets

OTHER PUBLICATIONS

Kompella, K. et al., LSP Hierarchy with Generalized MPLS TE, Internet Draft, Feb. 2002, draft-ietf-mpls-lsp-hierarchy-04.txt.

Miyabe, M. et al., A study of the GMPLS control architecture for IP photonic network, Electronic Information Communication Academic Technology Report; Dec. 10, 2001, vol. 101, No. 508, pp. 61-66, NS 2001-180, PS2001-46.

Matsumura et al., Proposal for a Multi-layer Integrated Routine Format Using a GMPLS, 2002 Electronic Information Communication Association Communication Society Draft Compilation, Communication Society 2, Japanese Laid-Open Patent Publication, SB11-2, p. 587, Aug. 20, 2002.

* cited by examiner

FIG. 17 (PRIOR ART)

DOMAIN-A CONNECTABILITY TABLE

| CONNECTION SOURCE | CONNECTION DESTINATION |
|---|---|
| a | b, c, d, e, f |

DOMAIN-B CONNECTABILITY TABLE

| CONNECTION SOURCE | CONNECTION DESTINATION |
|---|---|
| b | a, c, d, e, f |

DOMAIN-C CONNECTABILITY TABLE

| CONNECTION SOURCE | CONNECTION DESTINATION |
|---|---|
| c | a, b, d, e, f |

DOMAIN-D CONNECTABILITY TABLE

| CONNECTION SOURCE | CONNECTION DESTINATION |
|---|---|
| d, e | a, b, c, f |

DOMAIN-E CONNECTABILITY TABLE

| CONNECTION SOURCE | CONNECTION DESTINATION |
|---|---|
| f | a, b, c, d, e |

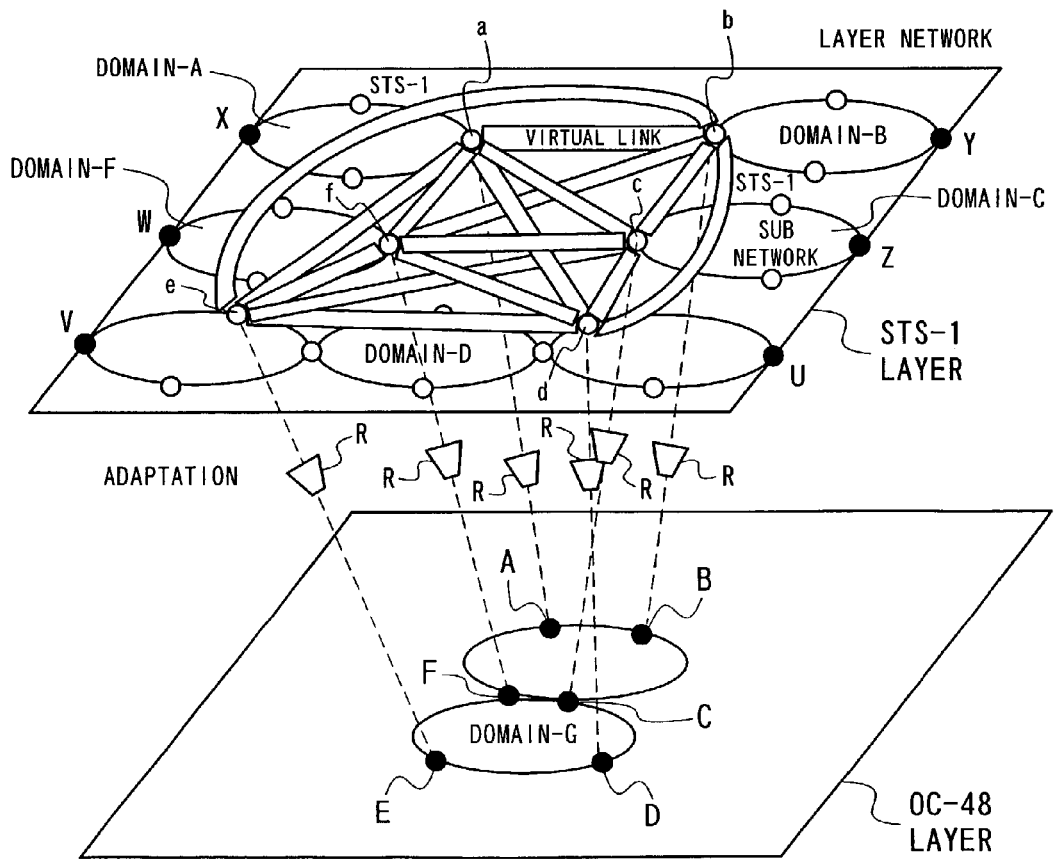

COMMUNICATION NETWORK CONTROL SYSTEM, CONTROL METHOD, NODE AND PROGRAM

BACKGROUND OF THE INVENTION

1. Field of the Invention

The present invention relates to a communication network control system, a control method, a node and a program, and more particularly, to a communication network control system, a control method, a node and a program in a hierarchical communication network formed of a plurality of links having different attributes.

2. Description of the Related Art

Among communication network control systems enabling path setting from a transmission source node to a destination node in a conventional communication network formed of a plurality of links having different attributes are, for example, ITU-T Recommendation G. 805 and the technique disclosed in Japanese Patent Laying-Open (Kokai) No. Heisei 11-177562.

In ITU-T Recommendation G.805, used as a method of regulating a complicated communication network constituted by a plurality of links having different attributes is taking the sub-network concept to use a layer structure relationship in the network.

A communication network shown in FIG. 12, for example, has such a layer network structure as shown in FIG. 13. Here, a domain-A, a domain-B, a domain-C, a domain-D and a domain-F are sub-networks formed of nodes which conduct switching on a granularity of an STS-1 (Synchronous Transport Signal-1). On the other hand, a domain-G is a sub-network formed of nodes which conduct switching on a granularity of OC-48 (Optical Carrier-48). The domain-A, the domain-B, the domain-C, the domain-D and the domain-F are all connected through the domain-G.

The communication network shown in FIG. 12 is accordingly a layer network formed of an STS-1 layer including the domain-A, the domain-B, the domain-C, the domain-D and the domain-F and an OC-48 layer including the domain-G.

One example of cross-connects which conduct switching on the granularity of the STS-1 is a SONET (Synchronous Optical Network) cross-connect. FIG. 14 is a conceptual diagram showing a SONET cross-connect. As shown in the figure, the SONET cross-connect enables a signal applied through an input port to be switchedly output to a different output port on a time slot basis. At this time, it is possible to assign a label to a time slot to manage correspondence between an input label and an output label, thereby handling data transmitted in time slots as LSP (LABEL Switched Path). The figure shows how data of a time slot #1 of a signal applied to a port 1 is output with its time slot switched to a time slot #3 as a signal output through a port 4.

One example of cross-connects which conduct switching on the granularity of the OC-48 is a wavelength cross-connect. FIG. 15 is a conceptual diagram of a wavelength cross-connect. As shown in the figure, the wavelength cross-connect is to output an input signal switchedly on a wavelength basis as an output signal while maintaining the order of its time slots. At this time, data transmitted in wavelength can be handled as LSP by assigning a label to a wavelength (port) and managing correspondence between an input label and an output label. The figure shows how data of the wavelength of the port 1 is output with its wavelength switched to the wavelength of the port 4.

FIG. 16 is a structural diagram of the communication network control system recited in Japanese Patent Laying-Open (Kokai) No. Heisei 11-177562. As shown in the figure, the communication network control system is formed of an operating system 801, a layer network information collecting function 802, a layer network forming function 803, a connectable point searching function 804, a virtual link generating function 805 and a path setting function 806.

Then, upon collecting network information (kind of transmission rate, distinction between synchronous and asynchronous networks, etc.) in the same layer from the operating system 801 of a network domain, the layer network information collecting function 802 sends out a layer network formation request to the layer network forming function 803. Upon receiving the formation request, the layer network forming function 803 forms the layer network in question based on the network information and when a lower-order layer network exists, forms the network based on connectability information collected from the lower-order layer network.

Connectability information from the lower-order layer may be directly collected by the layer network information collecting function 802 and applied to the layer network forming function 803 together with the network information or may be collected by the layer network forming function 803 through the layer network information collecting function 802. Next, the virtual link generating function 805 generates a virtual link as information about connectability between access points of the formed layer network based on the connectability information collected from the lower-order layer network.

More specifically, a lower-order layer network exists for a layer network having the function of generating a virtual link and also in the lower-order layer network, the layer network forming function 803 similarly forms a layer network, and the connectable point searching function 804 searches for connectability between access points of the formed layer network, generates connectability information and notifies the higher-order layer network of the information.

At the time of thus managing the communication network as divisional networks of layer structures formed based on network information collected from the operating system 801 of each network domain, according to the invention recited in Japanese Patent Laying-Open (Kokai) No. Heisei 11-177562, a virtual object link is set as connectability information in each layer network (more precisely, layer networks excluding the lowest-order layer network).

FIG. 17 shows an example of a layer network structure in a case where the communication network control system recited in Japanese Patent Laying-Open (Kokai) No. Heisei 11-177562 is applied to the communication network shown in FIG. 12. With reference to FIG. 17, the layer network is formed of an STS-1 layer and an OC-48 layer. The STS-1 layer has five sub-networks, a domain-A, a domain-B, a domain-C, a domain-D and a domain-F. The domain-A, the domain-B, the domain-C, the domain-D and the domain-F have clients (X, Y, Z, U, V, W), respectively, and between their relay nodes (a, b, c, d, e, f), virtual links indicated as wide white lines are set.

The OC-48 layer has a sub-network, a domain-G. The domain-G includes nodes (A, B, C, D, E, F).

In GMPLS (Generalized Multiprotocol Label Switching) discussed in IETF (Internet Engineering Task Force), the concept of Forwarding Adjacency (FA) is introduced into a virtual link generated between a transmission source node and a destination node of a path which is cut through a higher-order layer switch (IP (Internet Protocol) router, ATM (Asynchronous Transfer Mode) switch or the like) and switched by a lower-order layer switch (optical cross-connect, SONET cross-connect or the like). FA enables accommodation of a plurality of higher-order layer paths.

In the layered communication network control system conformed to ITU-T Recommendation G.805, as shown in FIG. 13, however, formation of a path between two sub-networks in the STS-1 layer is enabled only when a path of the lower-order OC-48 layer network is set up end-to-end. When the higher-order layer network (STS-1) knows that a path of the lower-order layer network (OC-48) is set up, it is therefore allowed to know that relay nodes of a higher-order layer sub-network which are end points of the lower-order layer path can be connected. On the other hand, when the high-order layer network fails to know that a path of the lower-order layer network (OC-48) is set up, whether relay nodes of a higher-order sub-network are connectable or not is unclear.

Under these circumstances, in ITU-T Recommendation G.805, for example, in a case of FIG. 18, with paths set between the node A and the node C and between the node C and the node E in the OC-48 layer, when a new path needs to be set up end-to-end from the domain A to the domain D in the STS-1 layer, since the domain A knows that the virtual link of the STS-1 layer exists between the node a and the node c (via the node b) and between the node c and the node e (via the node d), set up the path of the STS-1 end-to-end between the domain A and the domain D through the virtual link. However, since it is impossible to set up a path of the OC-48 directly connecting the node a and the node e and with the path as a virtual link, to set up a path of the STS-1 end-to-end between the domain A and the domain D, the route of the STS-1 path could not be the shortest, which disables effective use of resources.

On the other hand, the art disclosed in Japanese Patent Laying-Open (Kokai) No. Heisei 11-177562 solves the above-described problem and, when with a path set between the node A and the node F in the OC-48 layer as shown in FIG. 19, an end-to-end path needs to be newly set from the domain A to the domain D in the STS-1 layer, setting a new path of the OC-48 between the node F and the node E assuming that a free path exists between the node A and the node F leads to setting of an end-to-end path of the STS-1 from the domain A to the domain D.

However, in the STS-1 layer it is only known that no virtual link exists between the domain A and the domain D and it is not known that setting a virtual link between the domain F and the domain D enables setting of an STS-1 path between the domain A and the domain D via the node f, resulting in making a request for setting an OC-48 path between the domain A (node a) and the domain D (node e) from the OC-48 layer. As a result, OC-48 paths will be overlapped between the node a and the node f to cause a new problem that resources can not be effectively used.

SUMMARY OF THE INVENTION

In order to solve the above problems, a first object of the present invention is to provide a communication network control system enabling, in a network formed of links of different attributes, network resources to be effectively used at the time of setting a first path from a transmission source node to a destination node. A second object of the present invention is to provide a communication network control system capable of automatically generating a second path which is necessary for setting a first path from a transmission source node to a destination node and which can accommodate the first path.

According to the first aspect of the invention, a communication network control system for controlling a communication network formed of a plurality of links of different attributes, wherein
each node constituting the communication network has a data base whose topology covers links in the communication network,
the node comprises
route calculation means for obtaining a route to a destination node with reference to the data base when its own node is a transmission source node, and
route information transmission means for, when its own node is a transmission source node or an intermediate node, in order to transmit the route and information related to the route to the destination node along the route, transmitting the information in question to an adjacent node.

According to the present invention, the above-described arrangement enables effective use of network resources at the time of setting a first path from a transmission source node to a destination node and enables automatic generation of a second path which is necessary for setting the first path from the transmission source node to the destination node and which can accommodate the first path.

In the preferred construction, the communication network control system further comprises path setting means for, when its own node is an intermediate node and an attribute of a link managed by its own node is different from an attribute of a link managed by a transmission source node, setting a second path which passes through nodes having different link attributes together with a first path from the transmission source node to the destination node.

In another preferred construction, comparison between an attribute of a link managed by the transmission source node and an attribute of a link managed by the intermediate node is conducted in the transmission source node and the intermediate node.

In another preferred construction, transmission of route information for setting the first path and transmission of route information for setting the second path are conducted individually.

In another preferred construction, route information for setting the first path is transmitted being added to route information for setting the second path.

In another preferred construction, route information for setting the second path is transmitted from the transmission source node to a transmission source node of the second path.

In another preferred construction, the route calculation means obtains the route to the destination node by using a node whose switching granularity is not more than a predetermined switching granularity.

According to the second aspect of the invention, a communication network control method of controlling a communication network formed of a plurality of links of different attributes, wherein
each node constituting the communication network has a data base whose topology covers links in the communication network,
the method comprising the steps of
route calculation step of obtaining a route to a destination node with reference to the data base when its own node is a transmission source node, and
route information transmission step of, when its own node is a transmission source node or an intermediate node, in order to transmit the route and information related to the route to the destination node along the route, transmitting the information in question to an adjacent node.

In the preferred construction, the communication network control method further comprises a path setting step of, when its own node is an intermediate node and an attribute of a link managed by its own node is different from an attribute of a link managed by a transmission source node, setting a second path which passes through nodes having different link attributes together with a first path from the transmission source node to the destination node.

According to the third aspect of the invention, a communication network control program which is executed by a computer for controlling a communication network formed of a plurality of links of different attributes, wherein each node constituting the communication network has a data base whose topology covers links in the communication network, the control program comprising the functions of a route calculation function of obtaining a route to a destination node with reference to the data base when its own node is a transmission source node, and a route information transmission function of, when its own node is a transmission source node or an intermediate node, in order to transmit the route and information related to the route to the destination node along the route, transmitting the information in question to an adjacent node.

According to another aspect of the invention, a node in a communication network control system for controlling a communication network formed of a plurality of links of different attributes, wherein each node has a data base whose topology covers links in the communication network, the node comprises route calculation means for obtaining a route to a destination node with reference to the data base when its own node is a transmission source node, and route information transmission means for, when its own node is a transmission source node or an intermediate node, in order to transmit the route and information related to the route to the destination node along the route, transmitting the information in question to an adjacent node.

According to another aspect of the invention, a node in a communication network control system for controlling a communication network formed of a plurality of links of different attributes, wherein the communication network control system includes a management device for controlling one or a plurality of the nodes, the management device including a data base whose topology covers links in the communication network, route calculation means for obtaining a route to a destination node with reference to the data base and route related information transmission means for transmitting the route and information related to the route to the node, and wherein, the node includes route related information reception means for receiving the route and information related to the route from the management device and switch control means for controlling a switching switch of its own node based on the route related information.

According to another aspect of the invention, a node in a communication network control system for controlling a communication network formed of a plurality of links of different attributes, comprises a link attribute information storage region for storing an attribute of a link adjacent to its own node, a topology data base storage region for storing a data base whose topology covers links in the communication network, a route related information storage region for storing information related to route obtained with reference to the data base, a label management table storage region for storing at least input and output labels assigned based on the route and information related to the route obtained from an adjacent node, and a switching switch for data transmission controlled based on the route and the information related to the route.

According to another aspect of the invention, a node in a communication network control system for controlling a communication network formed of a plurality of links of different attributes, wherein the communication network control system includes a management device for controlling one or a plurality of the nodes, the management device includes a topology data base storage region for storing a data base whose topology covers links in the communication network, and a route related information storage region for storing information related to route obtained with reference to the data base, and wherein the node includes:

a label management table storage region for storing at least input and output labels assigned based on the route and information related to the route obtained from the management device, a link attribute information storage region for storing an attribute of a link adjacent to its own node, and a switching switch for data transmission controlled based on the route and the information related to the route.

According to another aspect of the invention, a communication network system formed of a plurality of links of different attributes, comprises means for, when transferring communication data from a transmission source to a destination node by using a first path, at the time of the selection of a route to the destination node conducted by the transmission source node, setting up a data base covering all the links of different attributes and generating information of a route whose metric (cost) is the minimum and in which information link attributes are described by using the data base, and at the time of setting the first path based on the route information, confirming an attribute of a link managed by each node on the first path route and when determining that an attribute of a link managed by a first node is different from an attribute of a link managed by the transmission source node, discriminating a second node which exists closer to the destination node than the first node on the route of the first path and which has the same attribute as the attribute of the link managed by the transmission source node, and means for determining that setting of a second path which can accommodate the first path from the first node to the second node is necessary and setting the second path.

According to another aspect of the invention, a communication network system formed of a plurality of links of different attributes, comprises means for, when transferring communication data from a transmission source node to a destination node by using a first path, at the time of setting the first path, confirming an attribute of a link managed by each node on the first path route and when determining that an attribute of a link managed by a first node is different from an attribute of a link managed by the transmission source node, discriminating a second node which exists closer to the destination node than the first node on the route of the first path and which has the same attribute as the attribute of the link managed by the transmission source node, and means for determining that setting of a second path which can accommodate the first path from the first node to the second node is necessary.

In the preferred construction, the means for determining that setting of the second path is necessary, when the first path route from the transmission source node to the destination node is selected, confirms an attribute of a link managed by each node on the first path route and when determining that the attribute of the link managed by the first node is different from the attribute of the link managed by the transmission source node, determines that setting of the second path which can accommodate the first path from the first node is necessary.

In another preferred construction, after the route of the first path from the transmission source node to the destination node is selected, the means for determining that setting of the second path is necessary confirms an attribute of a link managed by each node at the time of setting each node along the first path route and when determining that the attribute of the link managed by the first node is different from the attribute of the link managed by the transmission source node, determines that setting of the second path which can accommodate the first path from the first node is necessary.

In another preferred construction, for the discrimination of a second node of the second path, when selecting the route of the first path from the transmission source node to the destination node, an attribute of a link managed by each node on the route of the first path is confirmed to discriminate the second node existing closer to the destination node than the first node on the route of the first path and having the same attribute as the attribute of the link managed by the transmission source node.

In another preferred construction, for the discrimination of a second node of the second path, after determining that setting of the second path is necessary, the second node is discriminated which exists closer to the destination node than the first node on the route of the first path and has the same attribute as the attribute of the link managed by the transmission source node by checking a link management data base.

In another preferred construction, for the discrimination of a second node of the second path, after determining that setting of the second path is necessary, an attribute of a link managed by each node is confirmed at the time of setting for the second path conducted in each node along the route of the first path to discriminate the second node having the same attribute as the attribute of the link managed by the transmission source node.

According to another aspect of the invention, a distributed control communication network formed of a plurality of links of different attributes, comprises path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein the path setting means when determination is made at the transmission source node of the first path that setting of the second path which can accommodate the first path is necessary, transmits second path setting information from the transmission source node to transfer the information from the first node as a transmission source to the second node as a destination of the second path along the route of the second path, so that each node on the route of the second path which has received the second path setting information conducts setting of its own node for setting the second path, thereby setting the second path between the first node and the second node, and with the second path as a virtual link between the first node and the second node, transfers first path setting information from the transmission source node to the destination node of the first path along the route of the first path, so that each node on the route of the first path which has received the first path setting information conducts setting of its own node for setting the first path, thereby setting the first path between the transmission source node and the destination node.

According to another aspect of the invention, a distributed control communication network formed of a plurality of links of different attributes, comprises path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein the path setting means when determination is made at the transmission source node of the first path that setting of the second path which can accommodate the first path is necessary, adds second path setting information to first path setting information and transfers the first path setting information from the transmission source node of the first path to the first node as a transmission source of the second path along the route of the first path, so that each node on the route of the first path between the transmission source node and the first node which has received the first path setting information conducts setting of its own node for setting the first path, and transfers the second path setting information from the transmission source node of the second path to the second node as a destination along the route of the second path, so that each node on the route of the second path which has received the second path setting information conducts setting of its own node for setting second path, thereby setting the second path between the first node and the second node, and with the second path as a virtual link between the first node and the second node, transfers the first path setting information from the second node as a destination of the second path to the destination of the first path along the route of the first path, so that each node between the second node and the destination node on the route of the first path which has received the first path setting information conducts setting of its own node for setting the first path, thereby setting the first path.

According to another aspect of the invention, a distributed control communication network formed of a plurality of links of different attributes, comprises path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein the path setting means transfers first path setting information from the transmission source node to the destination of the first path along the route of the first path, so that each node on the route of the first path which has received the first path setting information makes determination on setting of the second path, when determining that setting of the second path is not necessary, after conducting setting of its own node for setting the first path, transfers the first path setting information to an adjacent node on the route of the first path and when determining that setting of the second path is necessary, transfers second path setting information to an adjacent node on the route of the first path, so that each node on the route of the first path which has received the second path setting information conducts setting of its own node for the setting of the second path, thereby setting the second path between the first node and the second node, and after setting the second path between the first node and the second node, with the second path as a virtual link between the first node and the second node, transfers the first path setting information from the second node as a destination of the second path to the destination node of the first path along the first path, so that each node on the route of the first path between the second node and the destination node which has received the first path setting information conducts setting of its own node for setting the first path, thereby setting the first path.

According to another aspect of the invention, a distributed control communication network formed of a plurality of links of different attributes, comprises path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein the path setting means transfers first path setting information from the transmission source node to the destination node of the first path along the route of the first path, so that each node on the route of the first path which has received the first path setting information makes determination on setting of the second path, when determining that setting of the second path is not necessary, after conducting setting of its own node for setting the first path, transfers the first path setting information to an adjacent node on the route of the first path and when determining that setting of the second path is necessary, discriminates the second node as a destination of the second path and transfers second path setting information from the first node as a transmission source of the second path to the second node as a destination along the route of the first path, so that each node on the route of the first path which has received the second path setting information conducts setting of its own node for the setting of the second path, thereby setting the second path between a first node and the second node, and simultaneously with the setting of the second path between the first node and the second node, with the second path as a virtual link between the first node and the second node, transfers the first path setting information from the second node as a destination of the second path to the destination node of the first path along the route of the first path, so that each node on the route of first path between the second node and the destination node which has received the first path setting information conducts setting of its own node for setting the first path, thereby setting the first path.

According to another aspect of the invention, a distributed control communication network formed of a plurality of links of different attributes, comprises path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein the path setting means transfers first path setting information from the transmission source node to the destination node of the first path along the route of the first path, so that each node on the route of the first path which has received the first path setting information makes determination on setting of a second path, when determining that setting of the second path is not necessary, after conducting setting of its own node for setting the first path, transfers the first path setting information to an adjacent node on the route of the first path and when determining that setting of the second path is necessary, adds the first path setting information to second path setting information, transfers the second path setting information to an adjacent node on the route of the first path, so that each node on the route of the first path which has received the second path setting information conducts setting of its own node for the setting of the second path, thereby setting the second path between the first node and the second node, and with the second path in question as a virtual link between the first node and the second node, the second node as a destination of the second path which has received the second path setting information transfers the first path setting information added to the second path setting information from the second node as a destination of the second path to the destination node of the first path along the route of the first path, so that each node on the route of first path between the second node and the destination node which has received the first path setting information conducts setting of its own node for setting the first path, thereby setting the first path.

According to another aspect of the invention, a communication network formed of a plurality of links of different attributes, wherein at the time of route calculation, the communication network is divided into networks as grouped on the basis of a link of a different attribute to obtain a path whose metric (cost) is the minimum by using only networks of a certain group, thereby automatically preventing setting of a second path which can accommodate a first path at a link of an arbitrary attribute.

According to another aspect of the invention, a communication network formed of a plurality of links of different attributes, wherein at the time of route calculation, when using a link of a certain attribute for a route, the number of successive hops is limited to obtain a route whose metric (cost) is the minimum, thereby limiting the number of hops of a path which has an arbitrary attribute.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 17 is a structural diagram of the layer network disclosed in Japanese Patent Laying-Open (Kokai) No. Heisei 11-177562;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 12:
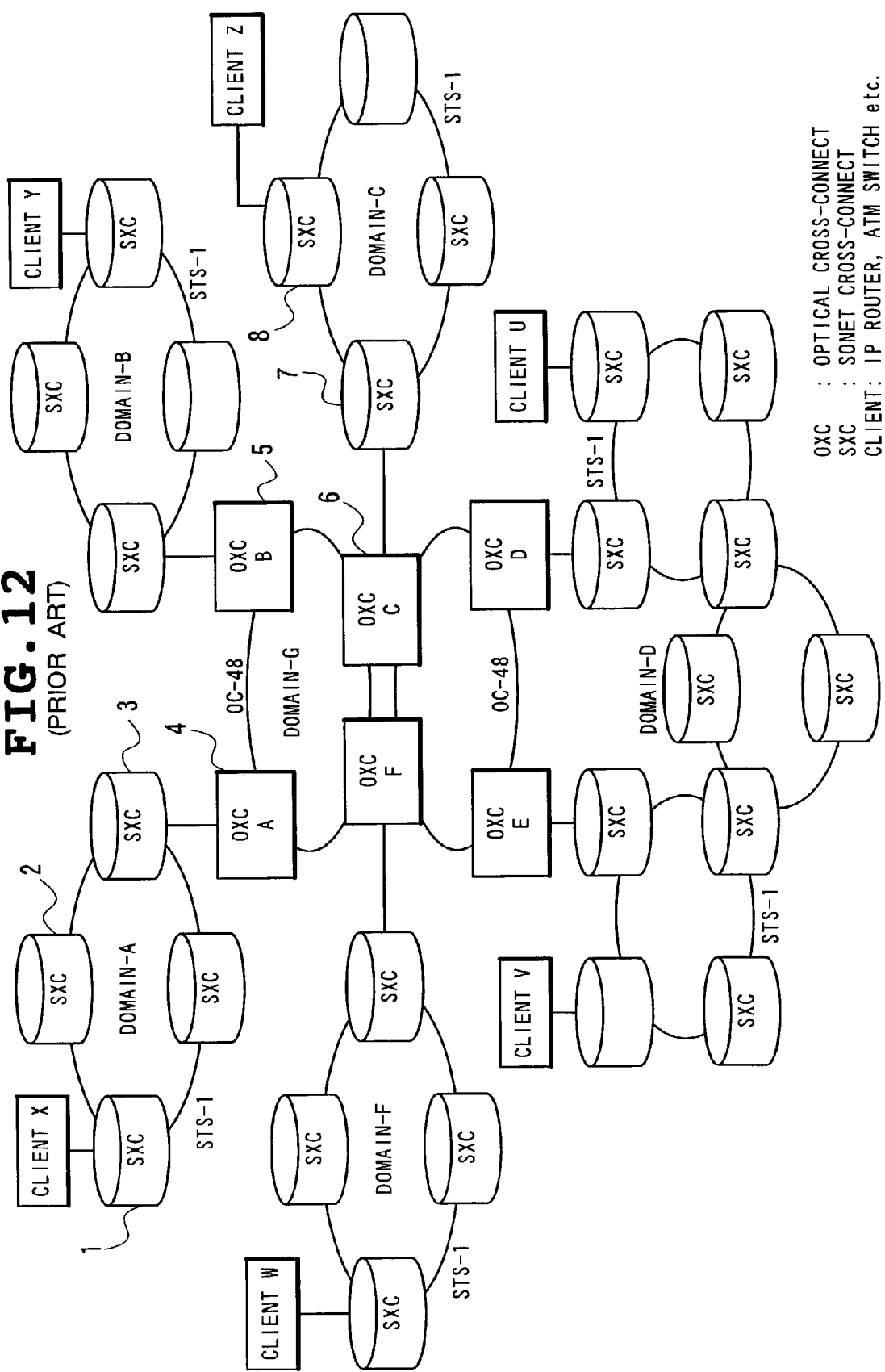
FIG. 12 is a structural diagram showing one example of a conventional communication network.
Figure 13:
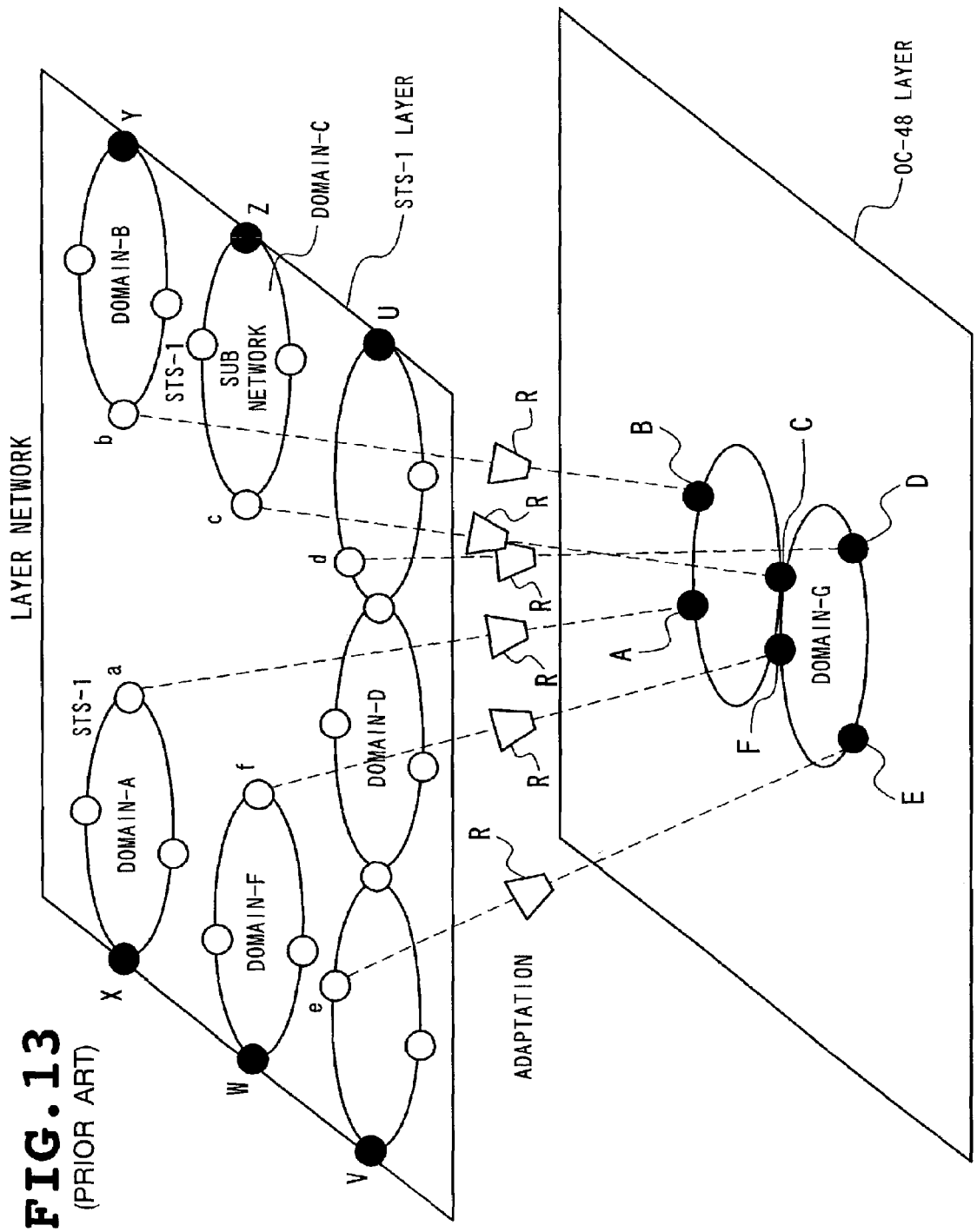
FIG. 13 is a structural diagram showing one example of a layer structure of the conventional communication network.
Figure 14:
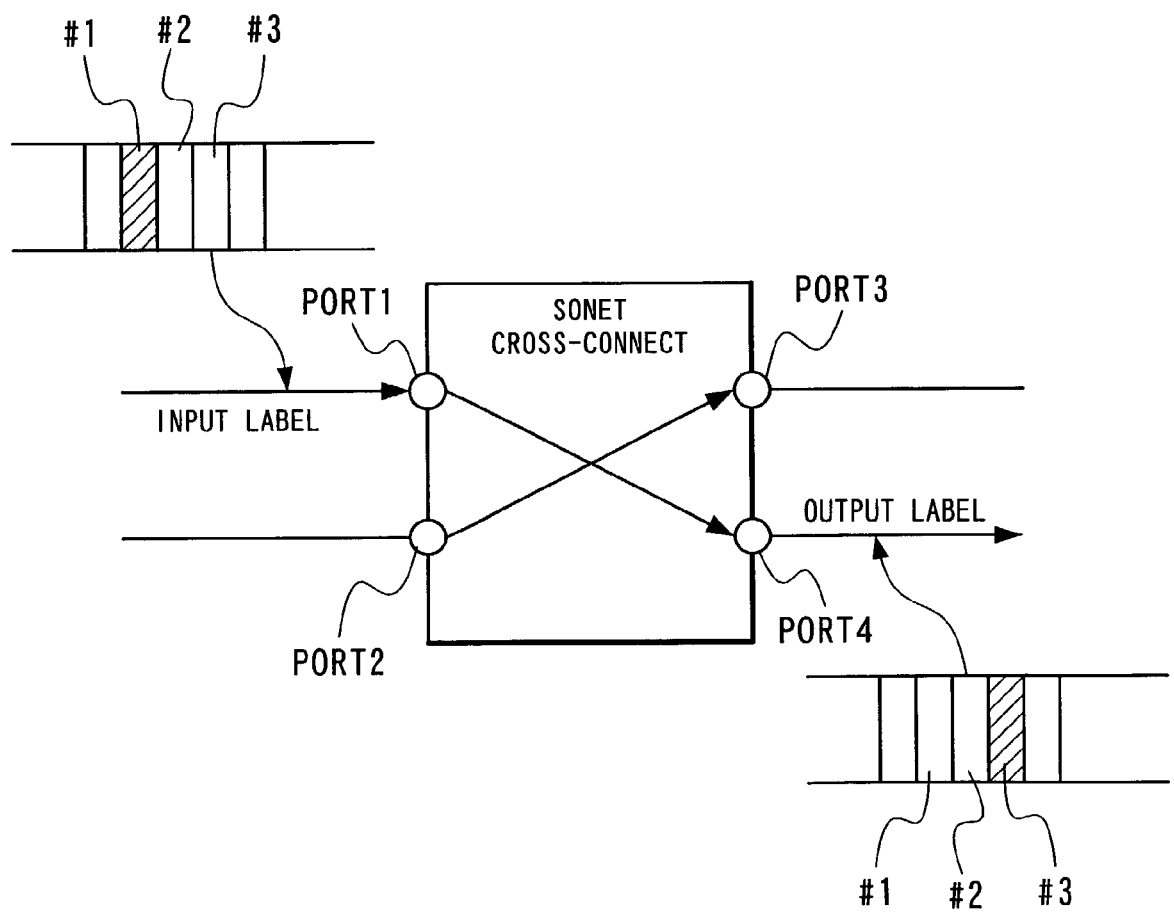
FIG. 14 is a conceptual diagram of a SONET cross-connect.
Figure 15:
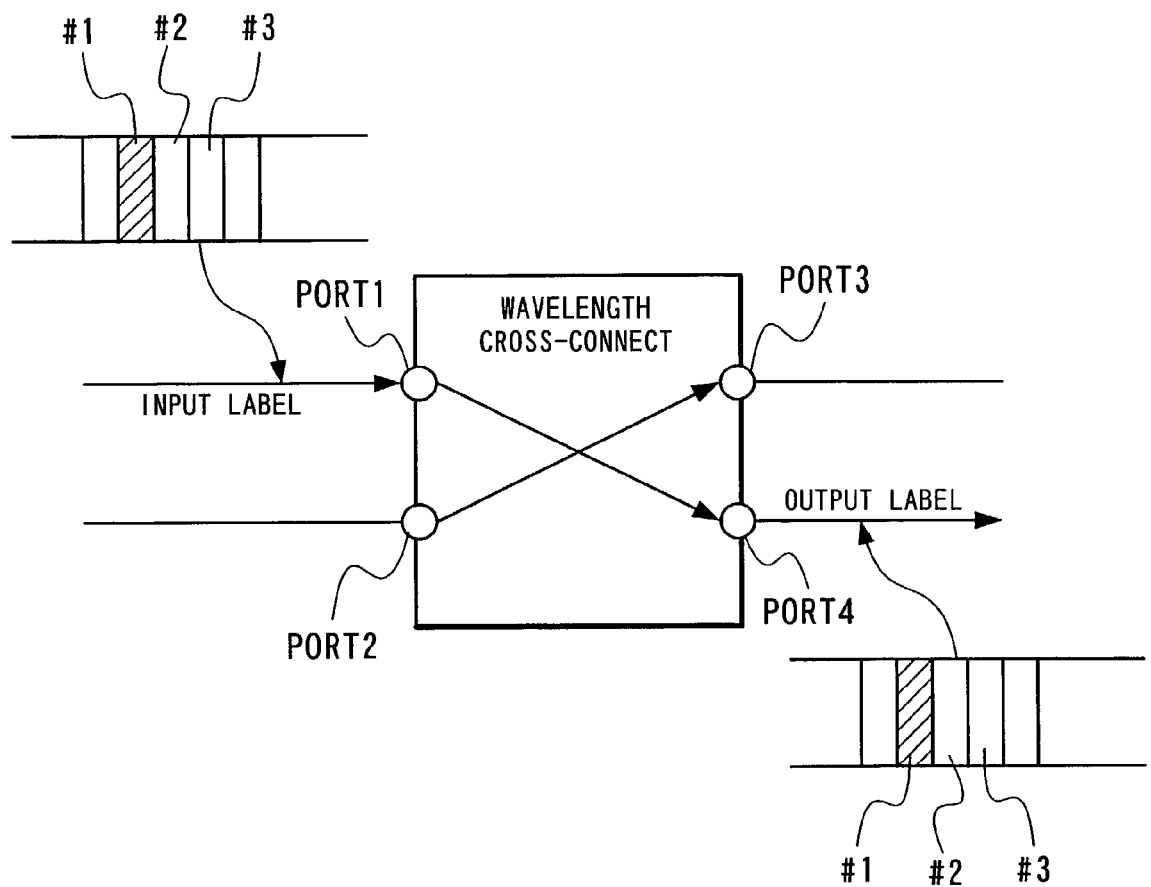
FIG. 15 is a conceptual diagram of a wavelength cross-connect.
Figure 16:
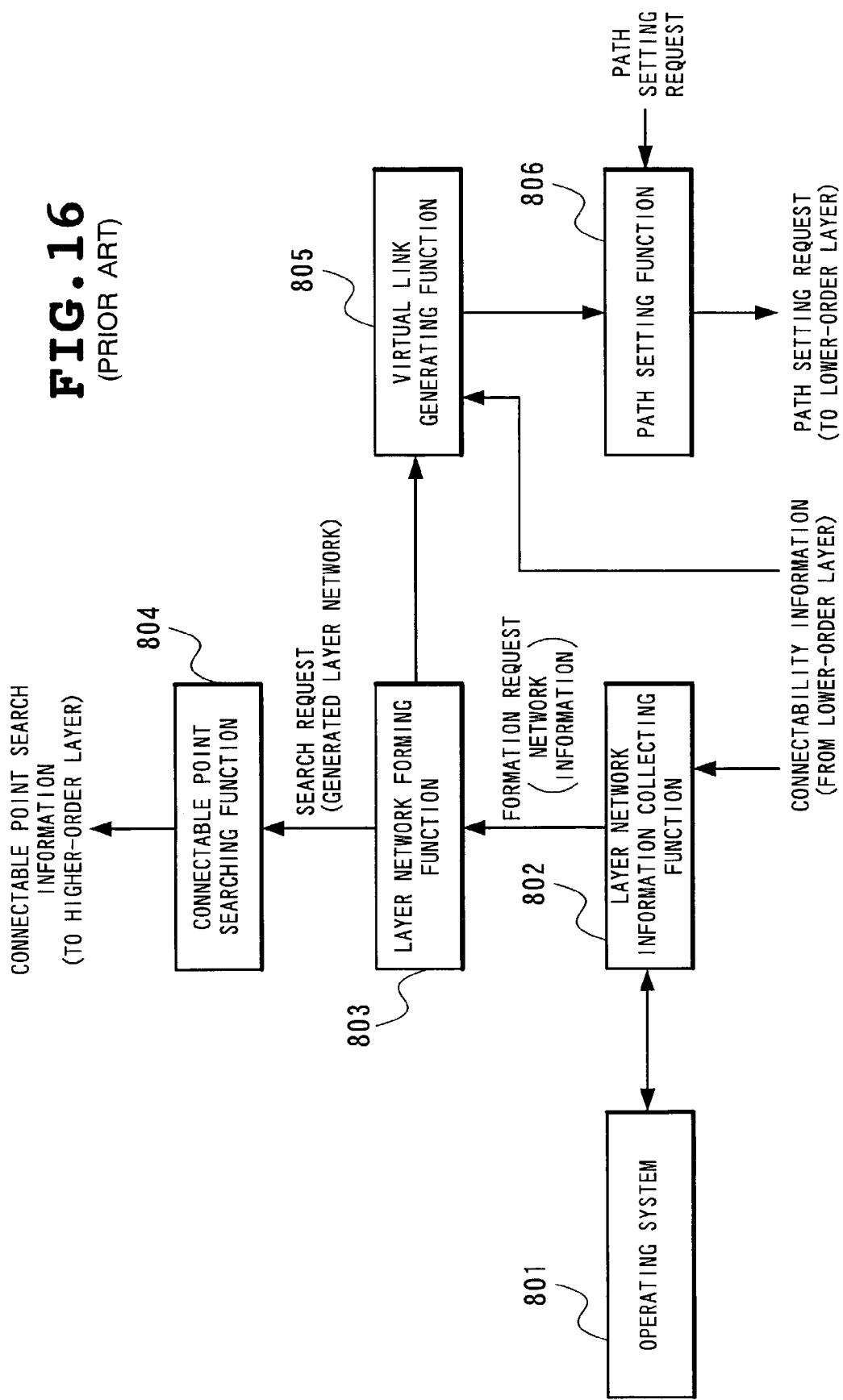
FIG. 16 is a structural diagram of the communication network control system disclosed in Japanese Patent Laying-open (Kokai) No. Heisei 11-177562.
Figure 18:
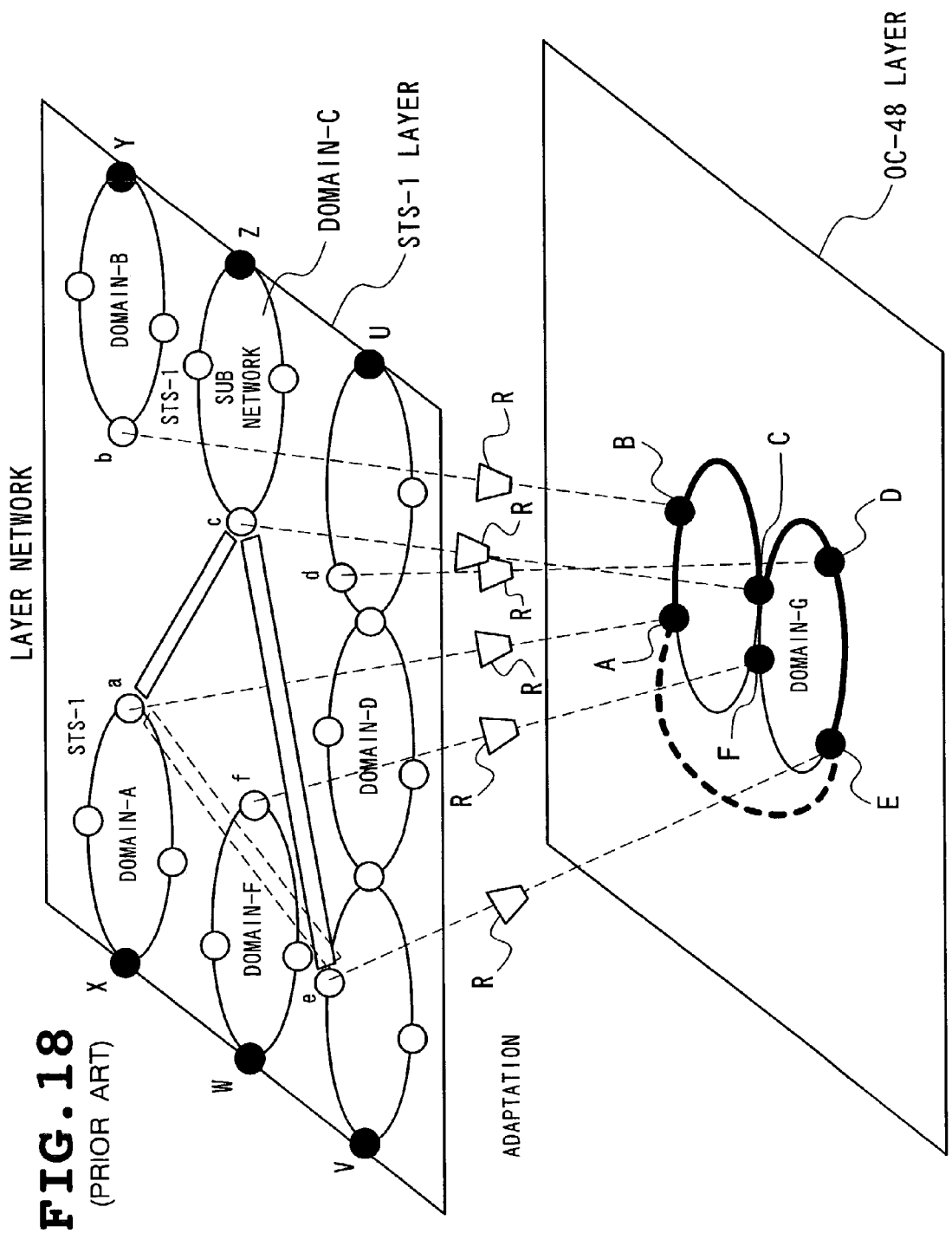
FIG. 18 is a structural diagram of one example of a conventional layer network.
Figure 19:
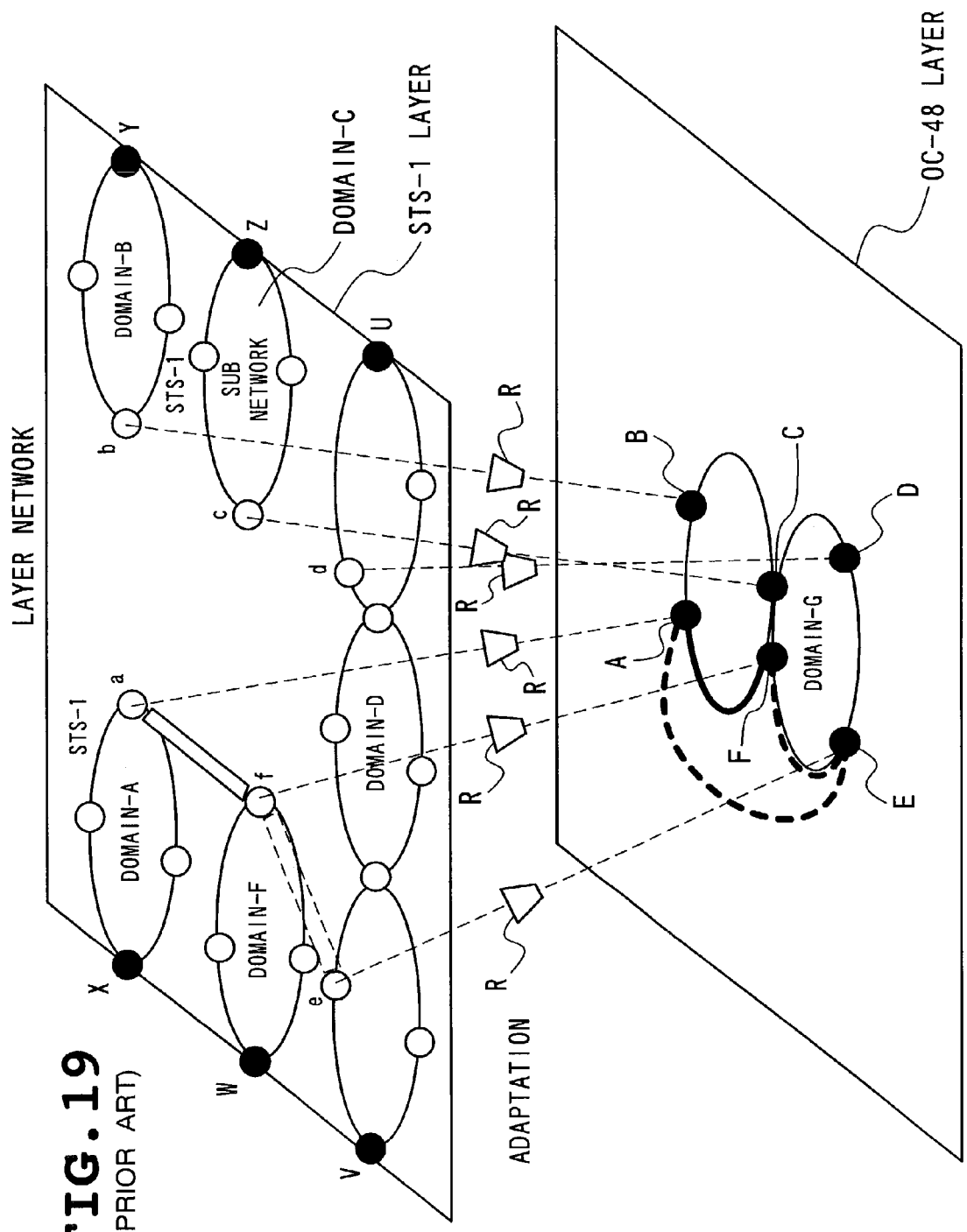
FIG. 19 is a structural diagram of another example of a conventional layer network.

First, the present invention will be outlined. In the structure diagram of a conventional communication network shown in FIG. 12, the present invention relates to a method of setting a path from a node SXC1 to which a client X is connected to a node SXC8 to which a client Z is connected. As the path, a path from the node SXC1 through SXC2, SXC3, OXC4, OXC5, OXC6 and SXC7 to the SXC8 is selected, in which the nodes SXC1 to SXC3 and SXC7 and SXC8 belong to the STS-1 layer, while the OXC4 to the OXC6 belong to the OC-48 layer whose attribute is different from that of the STS-1 layer.

In such a case, while in a conventional communication network, the node SXC3 of the STS-1 layer, for example, fails to know how connection (link) between the nodes OXC4 and OXC6 of the OC-48 layer as a lower-order layer is, in the present invention, the SXC1 as a transmission source node holds the connection information in question in advance (connection information not only about connection between the nodes OXC4 and OXC6 but also about connection between all the nodes SXC and the nodes OXC in the communication network: the information will be referred to as topology hereinafter). The node SXC1 therefore knows which path setting is possible between the nodes SXC1 and SXC8. It is then only necessary to conduct signaling for desired path setting.

Figure 1:
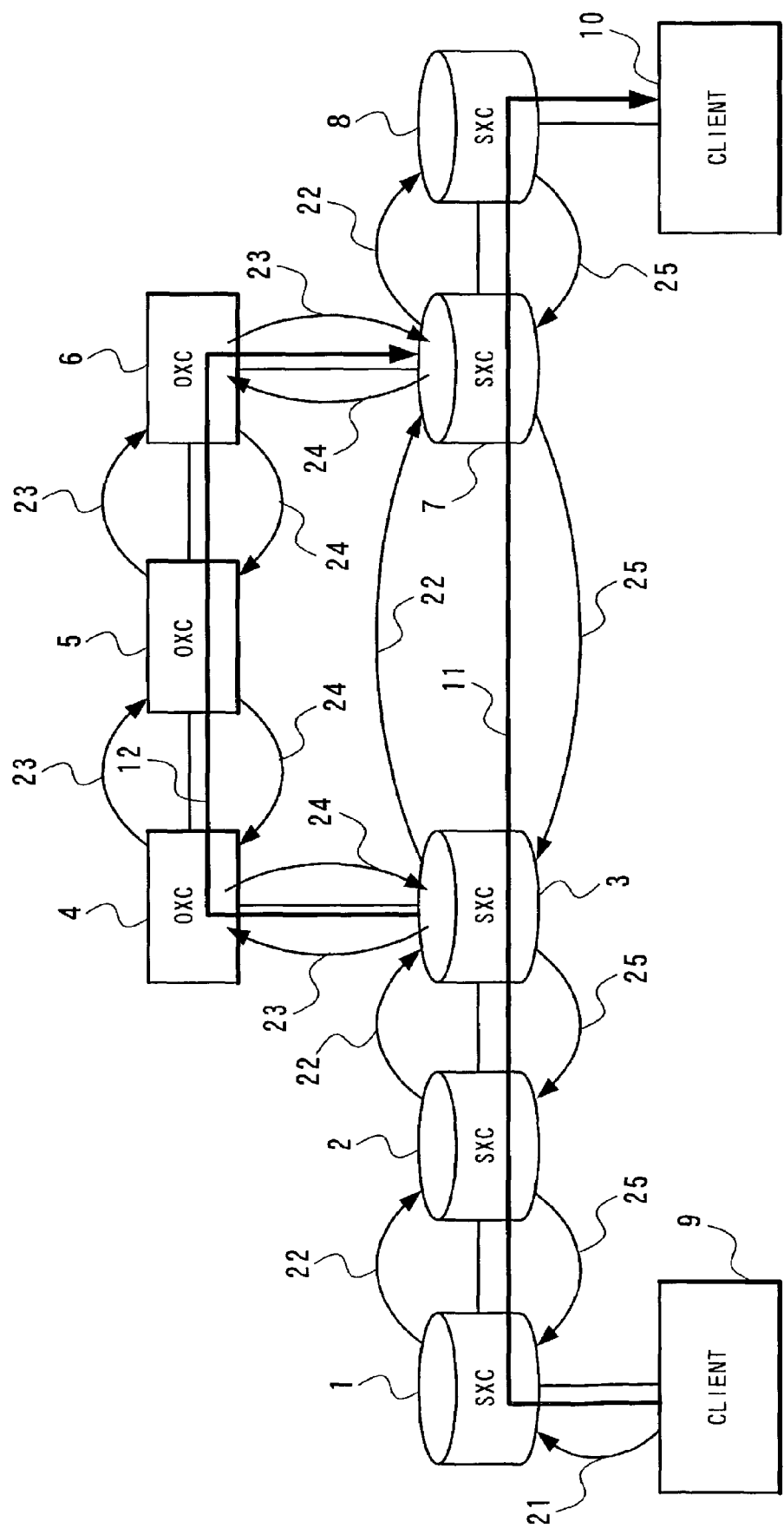
FIG. 1 is a structural diagram of a first mode of implementation of a communication network control system according to the present invention.

First, a first mode of implementation will be described. FIG. 1 is a structural diagram of a first mode of implementation of a communication network control system according to the present invention. In FIG. 1, the communication network control system includes nodes SXC 1 to 3, 7 and 8, nodes OXC4 to 6 and clients 9 and 10 as an example, which correspond to the nodes SXC 1 to 3, 7 and 8, the nodes OXC4 to 6 and the clients X and Z in FIG. 12, respectively.

Back to FIG. 1, the nodes SXC1 to 3, 7 and 8 represent a SONET cross-connect, while the nodes OXC4 to 6 represent a wavelength cross-connect. Furthermore, the nodes SXC1 to 3, 7 and 8 conduct switching in an STS-1, while the nodes OXC4 to 6 conduct switching in an OC-48. It is also premised that a link band between the respective nodes 1 to 8 is 2.4 Gb/s as an example.

Each of the nodes 1 to 8 constituting the communication network has a data base 212 (see FIG. 10 which will be described later) whose topology covers all the links of different attributes in the communication network.

Each of the nodes 1 to 8 has a function of storing and managing identifier, distinction between input and output, band, switching granularity of a link adjacent to its own node as link attributes (link attribute information) 211 (see FIG. 10), a function of advertising the link attribute information 211 within the network and a function of, upon a path setting request 21 from the connected clients 9 and 10, using all the links in the network which have a band equal to or wider than that of a requested path, that is, referring to the above-described topology data base 212, to obtain a path-whose metric (cost) is the minimum (hereinafter referred to as path information) from among all the links in the network which have a band equal to or wider than that of the requested path.

Each node further has a function (signaling 22) of transmitting obtained path information and information about LSP (Label Switched Path) band and framing (LSP attribute information) to its adjacent node in order to transmit the information to a destination node along a path, a function of assigning a label to an LSP to be set according to transmitted information and controlling a cross-connect switch of its own node, a function of managing correspondence between an identifier of an LSP and an input label/an output label assigned to the LSP as a label management table 214 (see FIG. 10), a function of comparing a switching granularity of a subsequent node on the path and a granularity of an LSP to be set, and a function of, when determining that the switching granularity of the subsequent node is larger than the granularity of the LSP to be set, obtaining a subsequent node which can be switched on the granularity of the LSP to be set based on the path information and setting the obtained node as a destination node of an LSP in a lower-order layer.

Each node further has a function of transmitting information about a band and framing of an LSP in a lower-order layer which can be switched by a subsequent node to a destination node along the path (signaling 23), a function of, upon receiving LSP setting information when its own node is a destination node, giving notification toward a transmission source node that LSP setting is completed (signaling 24, 25), a function of, upon receiving LSP setting completion information when its own node is a transmission source node, managing information related to the LSP (LSP attribute information) 213 (see FIG. 10), and a function of, when its own node is a transmission source node, if the LSP set is an LSP of a lower-order layer and has a free band for a path of a higher-order layer, advertising the LSP of the lower-order layer as a link with a destination node of the LSP in the network.

Figure 2:
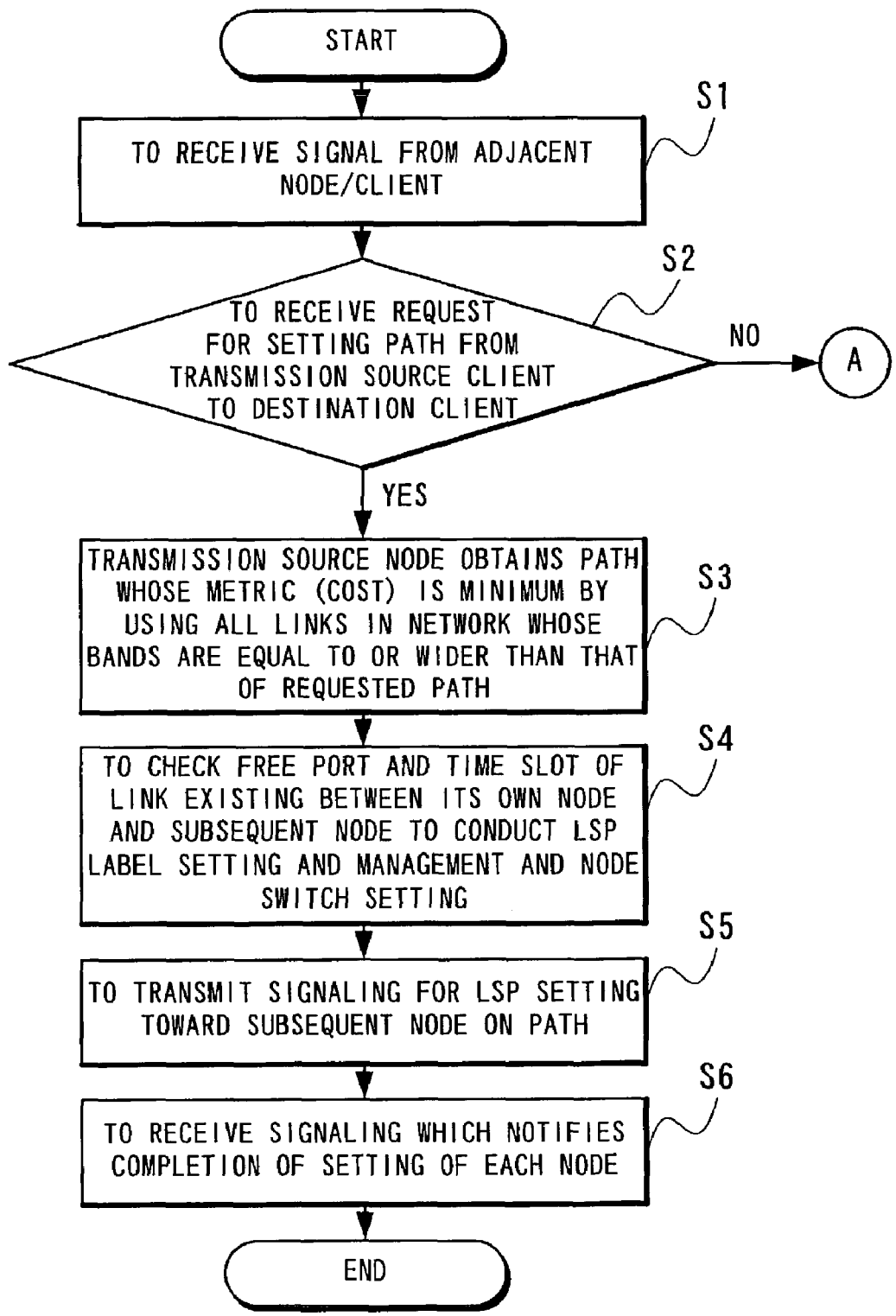
FIG. 2 is a flow chart showing operation of each of nodes 1 to 8.
Figure 3:
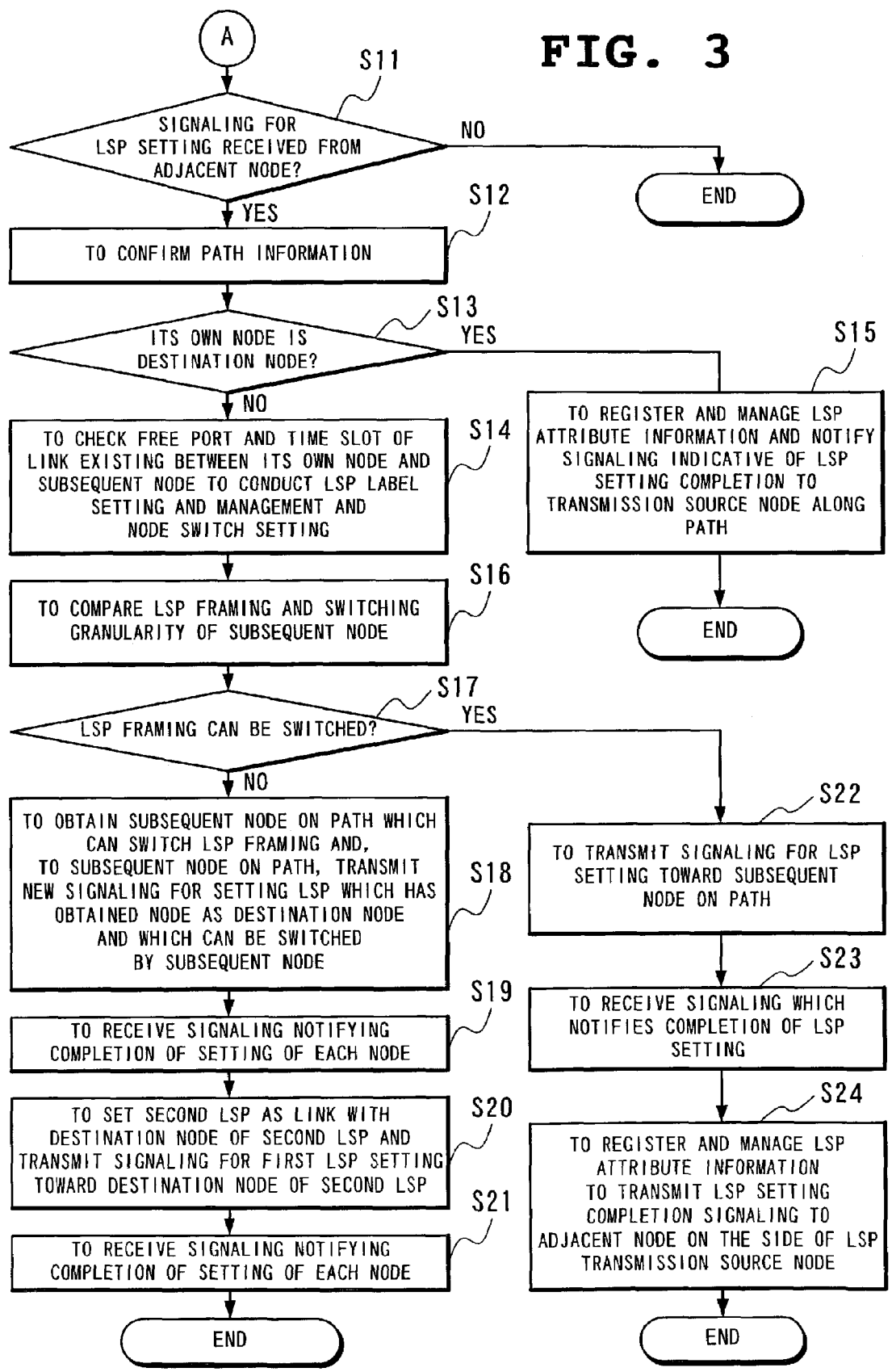
FIG. 3 is a flow chart showing operation of each of the nodes 1 to 8.

Next, operation of the first mode of implementation will be described. FIGS. 2 and 3 are flow charts showing operation of each of the nodes 1 to 8. More specifically, FIG. 2 shows operation of a transmission source node (SXC1 in the present mode of implementation), while FIG. 3 shows operation of the other nodes (SXC2, 3, 7, 8 and OXC4 to 6). Each of the nodes 1 to 8 has both a function as a transmission source node and a function as the other nodes.

First, with reference to FIGS. 1 and 2, the transmission source node SXC1 having received the request 21 for the STS-1 path setting from the transmission source client 9 to the destination client 10 (Step S1 and YES at Step S2 in FIG. 2) obtains a path whose metric (cost) is the minimum by using all the links in the network which have a band equal to or wider than that of the requested path (Step S3 in FIG. 2). In other words, the SXC1 obtains a path whose metric (cost) is the minimum by using the data of the topology data base 212 held by its own node.

Then, assign free port and time slot of a link existing between its own node and its subsequent node on the path to a first LSP 11, assign an input label and an output label to the first LSP 11 and store and manage the LSP ID and the labels paired in the label management table 214, and depending on circumstances, set a switch at the same time (Step S4 in FIG. 2). Then, along the obtained path, start the signaling 22 for setting the first LSP 11 (Step S5 in FIG. 2).

On the other hand, the node SXC2 having received the signaling 22 for setting the first LSP 11 from the transmission source node SXC1 (Step S1 and NO at Step S2 in FIG. 2 and YES at Step S11 in FIG. 3) first confirms the path information to determine whether its own node is a destination node of the first LSP 11 or not (Steps S12 and S13 in FIG. 3). Since the node SXC2 is not the destination node (NO at Step S13), assign free port, time slot of a link existing between its own node and the subsequent node on the path to the first LSP 11, assign an input label and an output label to the first LSP 11 and store and manage the LSP ID and the labels paired in the label management table 214, and depending on circumstances, set a switch at the same time (Step S14 in FIG. 3).

Next, compare framing of the first LSP11 and a switching granularity of the subsequent node SXC3 (Step S16 in FIG. 3) and since the subsequent node SXC3 is capable of switching the framing of the first LSP 11 (YES at Step S17), transmit the signaling 22 for the setting of the LSP 11 toward the subsequent node SXC3 on the path (Step S22 in FIG. 3).

Here, the routine of the SXC3 proceeds to Steps S11, S12, S13, S14, S16 and S17 similarly to the case of the SXC2 and since the switching granularity of the subsequent node OXC4 is larger than the framing of the first LSP 11 (NO at Step S17), refer to link attributes (information about switching granularity) stored in the topology data base 212 to obtain the node SXC7 which can subsequently switch the framing of the first LSP 11 along the path of the first LSP 11 and with respect to the OXC4, conduct the signaling 23 for setting a second LSP 12 which can accommodate the first LSP 11 with the SXC7 as a destination node (Step S18 in FIG. 3).

At this time, the transmission source node SXC3 of the second LSP 12 assigns a free port and a free wavelength (output label) of a link existing between its own node and a subsequent node on the path to the second LSP 12 and stores and manages the LSP ID and the labels paired in the label management table 214, and depending on circumstances, sets a switch at the same time.

On the other hand, the node OXC4 having received the signaling 23 for the setting of the second LSP 12 (Step S1 and NO at Step S2 in FIG. 2 and Step S11 in FIG. 3) first confirms path information similarly to the signaling 22 of the first LSP 11 (Step S12 in FIG. 3) to determine whether its own node is a destination node of the second LSP 12 (Step S13 in FIG. 3) or not. Then, when determining that its own node is not the destination node (NO at Step S13), assign a free port and a free wavelength of a link existing between its own node and the subsequent node OXC5 on the path to the second LSP 12, assign an input label and an output label to the second LSP 12 and store and manage the LSP ID and the labels paired in the label management table 214, and depending on circumstances, set a switch at the same time (Step S14 in FIG. 3).

If unlike the network structure shown in FIG. 1, comparison between the framing of the second LSP 12 and a switching granularity of a subsequent node (Step S16 in FIG. 3) results in that the switching granularity of the subsequent node is larger than the framing of the second LSP 12 to disable switching (NO at Step S17 in FIG. 3), obtain a node which can subsequently switch the framing of the second LSP 12 along the path of the second LSP 12 and conduct signaling for the setting of a third LSP which can accommodate the second LSP 12 with the obtained node as a destination node (Step S18 in FIG. 3). Signaling is sequentially conducted for setting a lower-order layer LSP in this manner as long as it is necessary. The OXC 5 and the OXC 6 conduct the same processing as that of the OXC4.

On the other hand, upon receiving the signaling 23 for the setting of the second LSP 12 from the OXC6 (Step S1 and NO at Step S2 in FIG. 2 and YES at Step S11 in FIG. 3), the destination node SXC7 of the second LSP 12 first confirms the path information (Step S12 in FIG. 3) to determine whether its own node is a destination node of the second LSP 12 (Step S13 in FIG. 3). Then, when determining that its own node is the destination node (YES at Step S13), assign an input label to the second LSP 12, store and manage the LSP ID and the label paired in the label management table 214, and transmit the signaling 24 which notifies that setting of each node is completed toward the transmission source node SXC3 of the second LSP 12 (Step S15 in FIG. 3) along the path.

After finishing the above-described processing at Step S18, when the transmission source node SXC3 of the second LSP 12 receives the signaling 24 which notifies completion of the setting of the second LSP 12 (Step S19 in FIG. 3), in order to make the second LSP 12 be a virtual link between the transmission source node SXC3 of the second LSP 12 and the destination node SXC7 of the second LSP 12, it manages an output port,a time slot of the transmission source node SXC3 of the second LSP 12 and an input port,a time slot of the destination node SXC7 of the second LSP 12 together with the ID of the LSP 12 and in order to set the first LSP 11 by using the virtual link, transmits the signaling 22 for the setting of the first LSP 11 toward the SXC7 (to be specific, through SXC3-OXC4-OXC5-OXC6-SXC7) (Step S20 in FIG. 3).

As to the information about the link between the SXC3 and the SXC7, both the transmission source node SXC3 of the second LSP 12 and the destination node SXC7 of the second LSP 12 store and manage the information in the link attribute information storage region 211.

Next, upon receiving the signaling 22 for the setting of the first LSP 11 from the SXC7 (Step S1 and NO at Step S2 in FIG. 2 and YES at Step S11 in FIG. 3), the destination node SXC8 of the first LSP 11 first confirms the path information (Step S12 in FIG. 3) to determine whether its own node is a destination node of the first LSP 11 or not (Step S13 in FIG. 3). Then, upon confirming that its own node is the destination node (YES at Step S13), assign the port, time slot to be connected to the destination client 10 which is designated by the LSP 11 setting information to the first LSP 11, assign an input label and an output label to the first LSP 11, store and manage the LSP ID and the labels paired in the label management table 214 and set a switch at the same time.

Then, register and manage the LSP attribute information of the first LSP 11 in its own node to transmit the signaling 25 which notifies the completion of the setting of the LSP 11 toward the transmission source node SXC1 of the first LSP11 along the path (Step S15 in FIG. 3). More specifically, transmission is made along SXC8-SXC7-OXC6-OXC5-OXC4-SXC3-SXC2-SXC1.

Each of the nodes 7, 3, 2 and 1 having received the signaling 25 indicative of the completion of the setting of the first LSP 11 (Step S23 in FIG. 3) registers and manages the LSP attribute information of the first LSP 11 in its own node and transmits the signaling 25 which notifies the completion of the setting of the LSP 11 toward the transmission source node SXC1 of the first LSP 11 along the path (Step S24 in FIG. 3). The foregoing processing ends the operation of the nodes 8, 7, 3 and 2.

On the other hand, when the transmission source node SXC1 which has started the signaling 22 for setting the first LSP 11 along the obtained path at the above-described Step S5 in FIG. 2 receives the signaling 25 which notifies the completion of the setting of the first LSP 11 (Step S6 in FIG. 2), setting of the end-to-end path from the transmission source client 9 to the destination client 10 is completed. In addition, the SXC3 advertises the second LSP 12 between the SXC3 and the SXC7 as a link and each node responsively updates the data of the topology data base 212. More specifically, each node adds information that a link exists to the topology data base 212 to update the data of the topology data base 212. At this time, information that the link is a virtual link may be additionally stored.

Although in the above-described mode of implementation, when comparison between a switching granularity of a subsequent node and a granularity of an LSP to be set finds that the switching granularity of the subsequent node is larger than the granularity of the LSP to be set, a lower-order layer LSP is set, it is possible, as another method, to assign an ID for identifying a node to each node in the network so as to distinguish layers at the time of assignment of IDs, check a node ID of a subsequent node on the path at the time of LSP setting to determine whether the subsequent node is of a different layer than that of its own node and set a lower-order layer LSP, and applicable as link attributes to be compared are transparency, network manager, device manufacturer and the like.

In addition, although in the above-described mode of implementation, after receiving the signaling 24 which notifies completion of the setting of the second LSP 12, the transmission source node SXC3 of the second LSP 12 transmits the signaling 22 for the setting of the first LSP 11 toward the SXC7 with the second LSP 12 as a virtual link between the SXC3 and the SXC7, simultaneously with the transmission of the signaling 23 for the setting of the second LSP 12 toward a node which is on the first LSP path and adjacent to the SXC3, the transmission source node SXC3 of the second LSP 12 may transmit the signaling 22 for the setting of the first LSP 11 toward the destination node SXC7 of the second LSP 12 with the second LSP 12 as a virtual link between the SXC3 and the SXC7.

Furthermore, while in the above-described mode of implementation, the transmission source node SXC3 of the second LSP 12 transmits the signaling 23 for the setting of the second LSP 12 and the signaling 22 for the setting of the first LSP 11 individually, another method is possible of transmitting the signaling 23 for the setting of the second LSP 12 with the signaling 22 for the setting of the first LSP 11 added thereto, taking out the signaling 22 for the setting of the first LSP 11 added to the signaling 23 for the setting of the second LSP 12 at the destination node SXC7 of the second LSP 12 and after conducting setting such as label assignment for the first LSP 11 and the second LSP 12, transmitting the signaling 22 for the setting of the first LSP 11 toward a node which is on the path of the first LSP and adjacent to the SXC7.

At this time, although the transmission source node SXC3 of the second LSP 12 identifies the destination node SXC7 of the second LSP 12, each node having received the signaling 23 for the setting of the second LSP 12 with the signaling 22 for the setting of the first LSP 11 added thereto may compare the switching granularity of its own node and the framing of the first LSP 11 to determine whether its own node is the destination node of the second LSP 12 or not.

Figure 4:
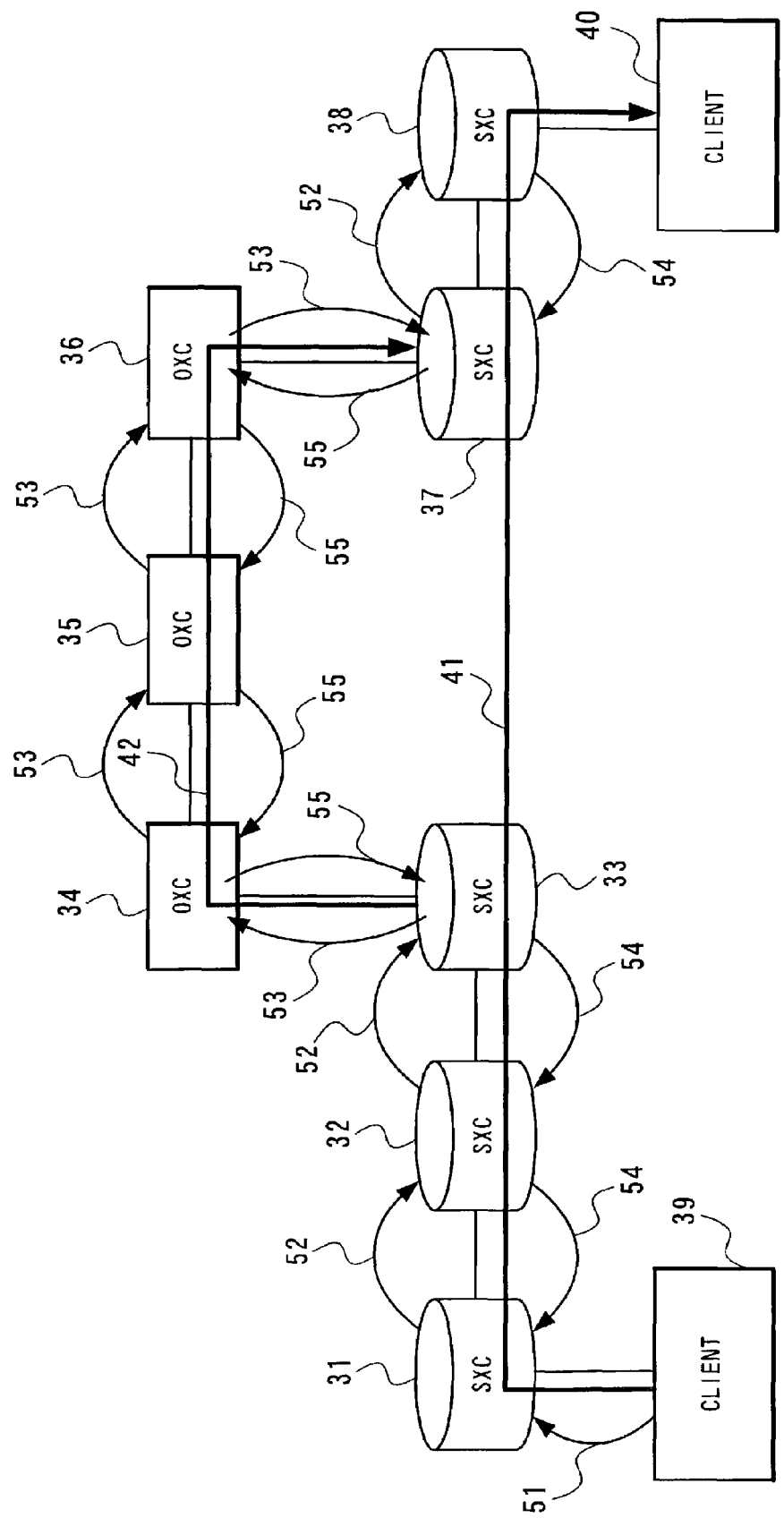
FIG. 4 is a structural diagram of a second mode of implementation of the communication network control system according to the present invention.

Next, a second mode of implementation will be described. FIG. 4 is a structural diagram of a second mode of implementation of the communication network control system according to the present invention. Each of nodes 31 to 38 which will be described later has the data base 212 (see FIG. 10 which will be described later) whose topology covers all the links of different attributes in the communication network similarly to the nodes 1 to 8 in the first mode of implementation.

With reference to FIG. 4, each of the nodes 31 to 38 constituting the communication network according to the second mode of implementation of the present invention has a function of managing identifier, distinction between input and output,band,switching granularity of a link as link attributes, a function of advertising the link attribute information within the network and a function of, upon a path setting request 51 from connected clients 39 and 40, using all the links in the network which have a band equal to or wider than that of a requested path to obtain a path whose metric (cost) is the minimum.

Each node further has a function of comparing a switching granularity of each of all the nodes on the path and a granularity of an LSP to be set, a function of, when determining that there exists a node whose switching granularity is larger than the granularity of the LSP to be set, designating the node as a transmission target node of a lower-order layer LSP, a function of obtaining a subsequent node on the path which can conduct switching on the granularity of the LSP to be set and designating the node as a destination node of the lower-order layer LSP, a function of designating a transmission target node and a destination node of an LSP in a further lower-order layer by the same means and a function of explicitly indicating the transmission target node and the destination node of the lower-order LSP in the path information.

Each node further has a function of transmitting obtained path information and information about LSP band and framing to a destination node along the path, a function of assigning a label to the LSP to be set according to transmitted information and controlling the cross-connect switch of its own node, a function of, when its own node is designated as a transmission target node of a lower-order layer LSP, adding higher-order layer LSP setting information to lower-order layer LSP setting information, a function of transmitting information about a band and framing of a lower-order layer LSP to a destination node of the lower-order layer LSP along the path and a function of, when its own node is a transmission target node of a lower-order layer LSP, upon receiving lower-order layer LSP setting completion information, taking out higher-order layer LSP setting completion information added to the received information and transmitting the higher-order layer setting completion information to a transmission target node of the higher-order layer LSP.

Each node further has a function of, upon receiving lower-order layer LSP setting information when its own node is a destination node of a lower-order layer LSP, taking out higher-order layer LSP setting information added to the received information and transmitting the higher-order layer setting information to a destination node of the higher-order layer LSP, a function of, upon receiving the higher-order layer LSP setting completion information when its own node is a destination node of the lower-order layer LSP, adding the information to lower-order layer LSP setting completion information and transmitting the obtained information to a transmission target node of the lower-order layer LSP along the path, a function of, upon receiving the higher-order layer LSP setting information when its own node is a destination node of the higher-order layer LSP, giving notification toward the transmission source node of the higher-order layer LSP that the setting of the higher-order layer LSP is completed, a function of, upon receiving the LSP setting completion information when its own node is a transmission source node, managing information about the LSP, and a function of, when its own node is a transmission source node, if the LSP set is a lower-order layer LSP and has a free band for a higher-order layer path, advertising the lower-order layer LSP in question as a link with a destination node of the LSP in question in the network.

Figure 5:
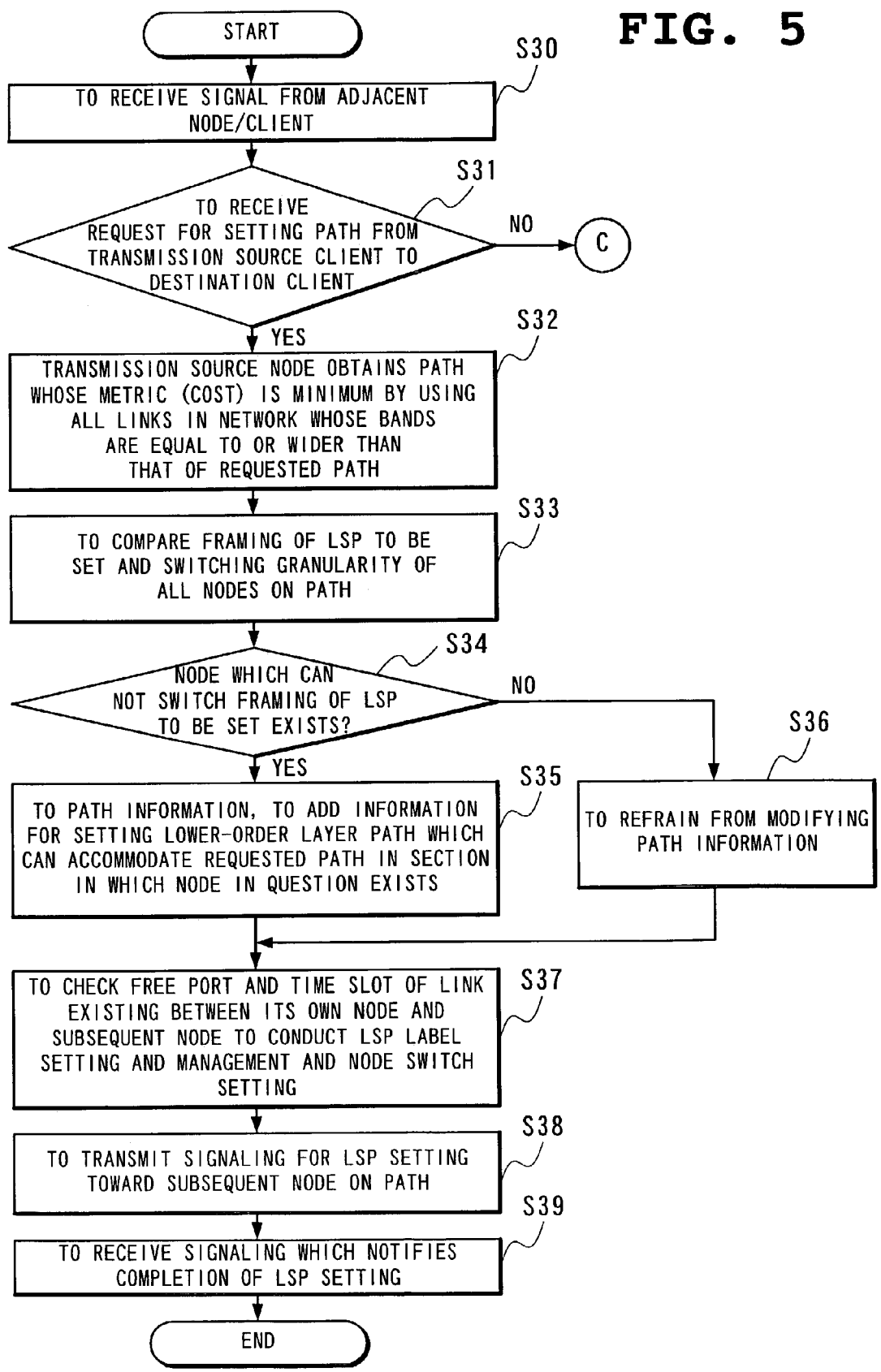
FIG. 5 is a flow chart showing operation of each node in the second mode of implementation.
Figure 6:
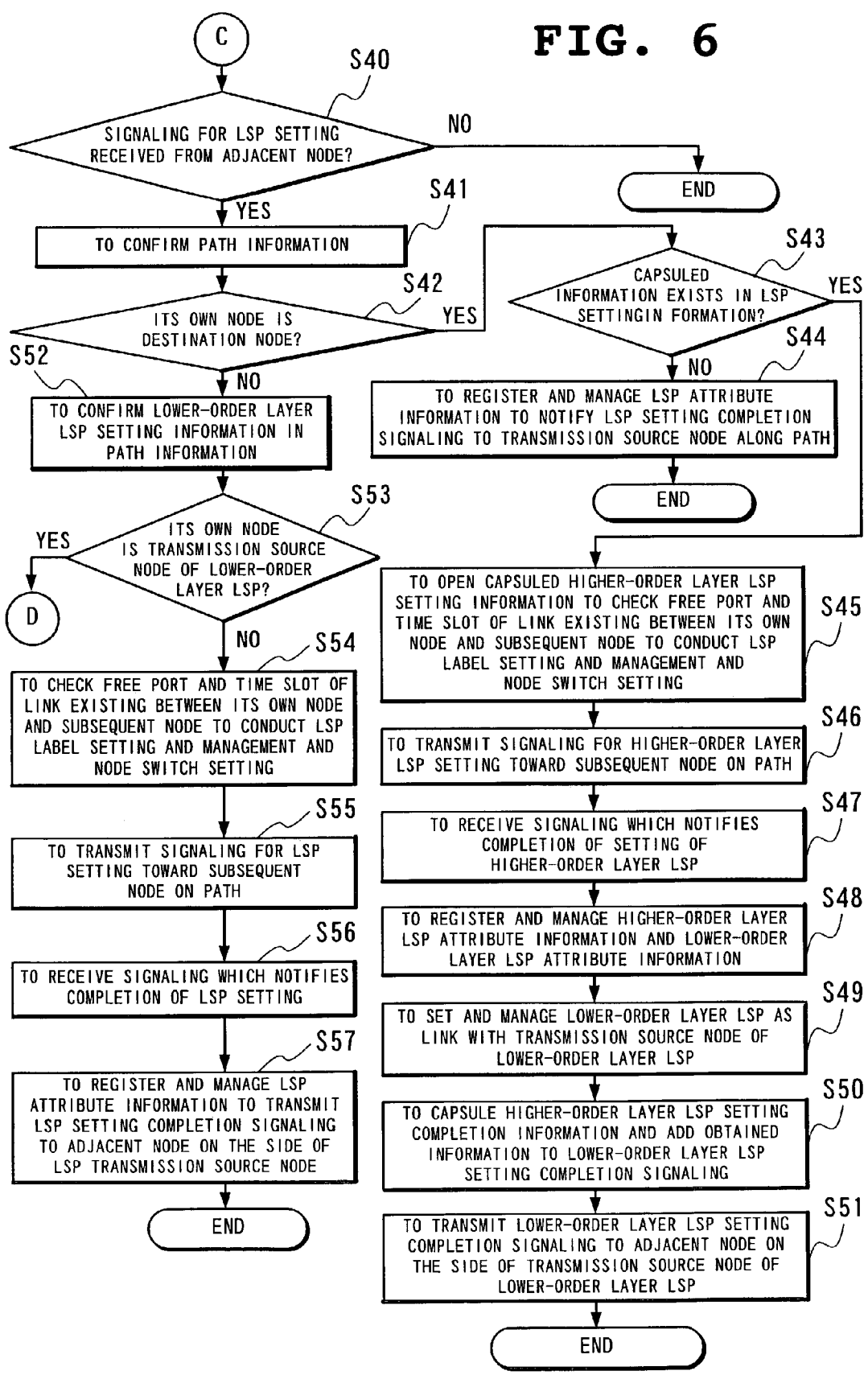
FIG. 6 is a flow chart showing operation of each node in the second mode of implementation.
Figure 7:
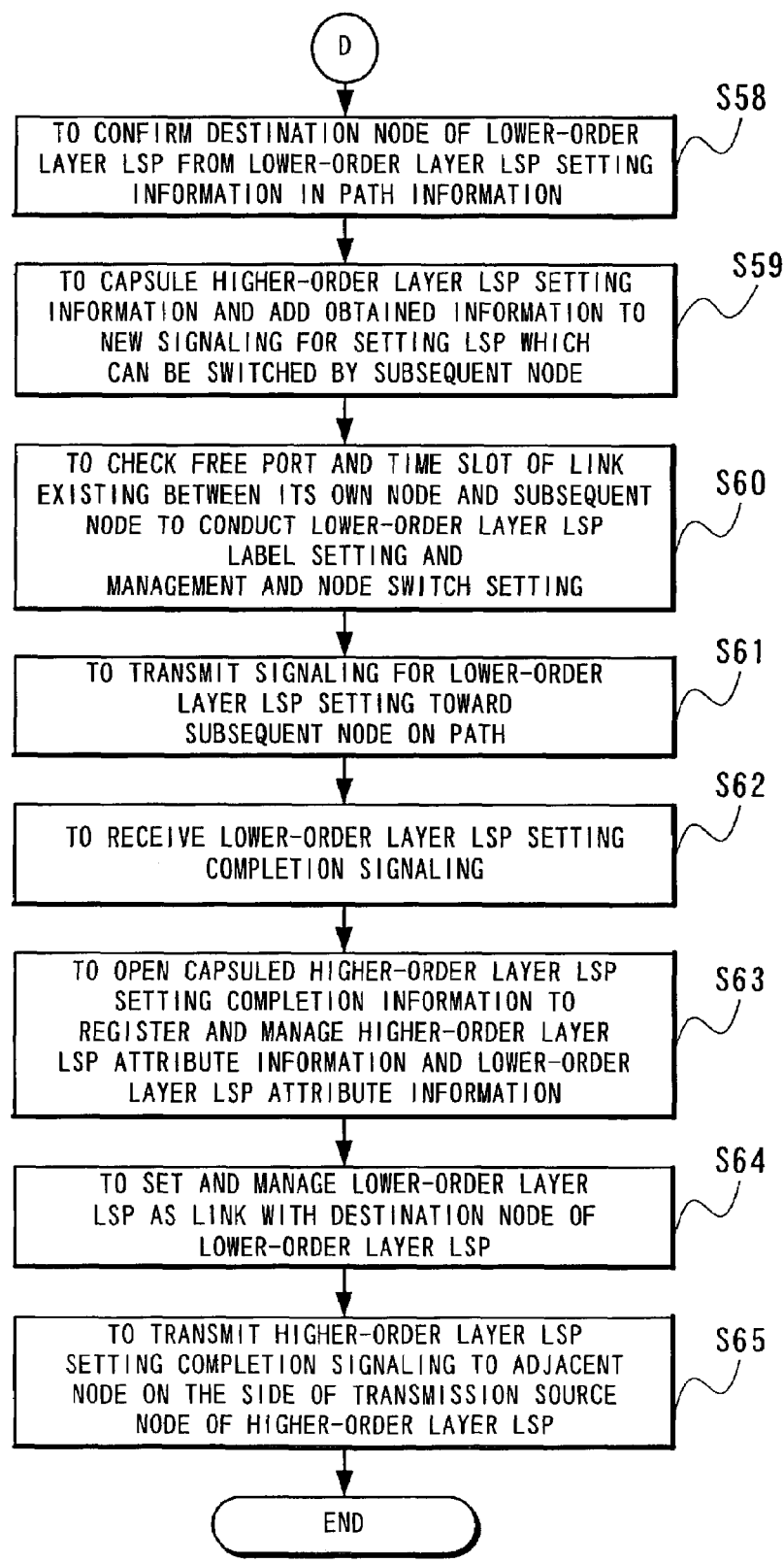
FIG. 7 is a flow chart showing operation of each node in the second mode of implementation.

FIG. 5 is a flow chart showing operation of the SXC31 in the second mode of implementation of the present invention illustrated in FIG. 4, while FIGS. 6 and 7 are flow charts showing operation of the SXC32, 33, 37 and 38 and OXC 34 to 36 in the second mode of implantation of the present invention illustrated in FIG. 4. With reference to FIGS. 4 to 7, operation of the second mode of implementation of the present invention will be described.

In FIG. 5, the SXC31 having received the path setting request 51 for the STS-1 from the transmission source client 39 to the destination client 40 (Step S30 and YES at Step S31 in FIG. 5) obtains a path whose metric (cost) is the minimum by using all the links in the network which have a band equal to or wider than that of a requested path (Step S32).

Next, the transmission source node SXC31 compares framing of an LSP 41 to be set and a switching granularity of each of all the nodes on the path (Step S33) to determine whether there exists a node which can not be switched by the framing of the LSP 41 to be set (Step S34). Then, when there exists a node which can not be switched by the framing of the LSP 41 to be set (YES at Step S34), describe, in path information to be transmitted at the time of signaling, the section in which the node in question exists as a section in which a second lower-order layer LSP 42 that can accommodate the LSP 41 is to be set (Step S35).

Then, assign free port, time slot of a link existing between its own node and a subsequent node on the path to the first LSP 41, assign an input label and an output label to the first LSP 41 and store and manage the LSP ID and the labels paired in the label management table 214, and depending on circumstances set a switch at the same time (Step S37 in FIG. 5). Next, start signaling 52 for setting the first LSP 41 along the obtained path (Step S38).

On the other hand, the subsequent node SXC32 which has received the signaling 52 for the setting of the first LSP 41 (Step S30 and NO at Step S31 in FIG. 5 and YES at Step S40 in FIG. 6) confirms path information (Step S41) and since its own node is not a destination node of the first LSP 41 (NO at Step S42), further confirms second LSP 42 setting section information in the path information (Step S52) and since its own node is not a transmission source node of the second LSP 42 (NO at Step S53), assigns free port, time slot of a link existing between its own node and the subsequent node on the path to the first LSP 41, assigns an input label and an output label to the first LSP 41 and stores and manages the LSP ID and the labels paired in the label management table 214, and depending on circumstances, sets a switch at the same time (Step S54). Then, transmit the signaling 52 for the setting of the LSP 41 toward the subsequent node SXC 33 on the path (Step S55 in FIG. 6).

On the other hand, the routine of the node SXC33 proceeds to Step S30 and NO at Step S31 in FIG. 5, YES at Step S40, Steps S41, S42, S52 and S53 in FIG. 6 and since its own node is designated as the transmission source node of the second LSP 42 (YES at Step S53), confirm the destination node SXC37 of the second LSP 42 indicated in the path information (Step S58 in FIG. 7 to add the first LSP 41 setting information to signaling for the setting of the second LSP 42 (Step S59).

Then, assign free port, time slot of a link existing between its own node and the subsequent node on the path to the second LSP 42, assign an output label to the second LSP 42 and store and manage the LSP ID and the label paired in the label management table 214, and depending on circumstances, set a switch at the same time (Step S60 in FIG. 7). Then, transmit signaling 53 for the setting of the LSP 42 toward the subsequent node OXC 34 on the path (Step S61 in FIG. 7).

On the other hand, the node OXC34 which has received the signaling 53 for the setting of the second LSP 42 proceeds to Step S30 and NO at Step S31 in FIG. 5, YES at Step S40, Step S41 and NO at Step S42 in FIG. 6 to confirm third LSP setting section information in the path information (Step S52) and since its own node is not a transmission source node of the third LSP (NO at Step S53), assigns free port, wavelength of a link existing between its own node and the subsequent node on the path to the second LSP 42, assigns an input label and an output label to the second LSP 42 and stores and manages the LSP ID and the labels paired in the label management table 214, and depending on circumstances, sets a switch at the same time (Step S54). Then, transmit the signaling 53 for the setting of the LSP 42 toward the subsequent node OXC 35 on the path (Step S55).

On the other hand, when its own node is designated as the transmission source node of the third LSP at Step S53 (YES at Step S53), confirm a destination node of the third LSP indicated in the path information (Step S58 in FIG. 7) and add the second LSP 42 setting information to signaling for the setting of a third LSP (Step S59). Then, assign free port, wavelength of a link existing between its own node and the subsequent node on the path to the third LSP, assign an output label to the third LSP and store and manage the LSP ID and the label paired in the label management table 214, and depending on circumstances, set a switch at the same time (Step S60 in FIG. 7). Then, transmit the signaling for the setting of the third LSP toward the subsequent node on the path (Step S61).

Signaling is thus sequentially conducted for setting a lower-order layer LSP as many times as required. The nodes OXC 35 and 36 and the node OXC34 execute the same processing.

On the other hand, when the destination node SXC37 of the second LSP 42 proceeds to Step S30, NO at Step S31 in FIG. 5 and YES at Step S40 in FIG. 6 to receive the signaling 53 for the setting of the second LSP 42 from the node SXC36, it confirms the path information (Step S41) to find that its own node is a destination node of the second LSP 42 (YES at Step S42), so that it checks existence/non-existence of the first LSP 41 setting information added to the second LSP 42 setting information (Step S43) to find that the first LSP 41 setting information is added (YES at Step S43), assigns free port, time slot of a link existing between its own node and the subsequent node on the path to the first LSP 41, assigns an input label and an output label to the first LSP 41 and stores and manages the LSP ID and the labels paired in the label management table 214, and depending on circumstances, sets a switch at the same time (Step S45). Then, transmit the signaling 52 for the setting of the first LSP 41 toward the subsequent node SXC38 on the path (Step S46).

When the destination node SXC38 of the first LSP 41 proceeds to Step S30, NO at Step S31 in FIG. 5 and YES at Step S40 in FIG. 6 to receive the signaling 52 for the setting of the first LSP 41 from the node SXC37, it confirms the path information (Step S41) to find that its own node is the destination node of the first LSP 41 (YES at Step S42 and NO at Step S43), assigns port, time slot to be connected to the destination client 40 designated by the LSP 41 setting information to the first LSP 41, assigns an input label and an output label to the first LSP 41, stores and manages the LSP ID and the labels paired in the label management table 214 and sets a switch at the same time. Then, register and manage the LSP attribute information of the first LSP 41 in its own node and transmit signaling 54 for notifying the completion of the setting of the first LSP 41 toward the transmission source node SXC 31 of the first LSP 41 along the path (Step S44).

On the other hand, when the destination node SXC37 of the second LSP 42 which has transmitted the signaling 52 for the setting of the first LSP 41 toward the subsequent node SXC38 on the path at the above-described Step S46 receives the signaling 54 which notifies the completion of the setting of the first LSP 41 from the node SXC 38 (Step S47), the destination node SXC37 registers and manages the LSP attribute information of the first LSP 41 and the LSP attribute information of the second LSP 42 in its own node (Step S48) and in order to make the second LSP 42 as a virtual link between the transmission source node SXC33 of the second LSP 42 and the destination node SXC37 of the second LSP 42, manages an output port, a time slot of the transmission source node SXC33 of the second LSP 42 and an input port, a time slot of the destination node SXC37 of the second LSP 42 together with the ID of the LSP 42 (Step S49) to add the first LSP 41 setting completion information to signaling which notifies the completion of the setting of the second LSP 42 (Step S50). Then, the destination node SXC37 transmits signaling 55 which notifies the completion of the setting of the second LSP 42 toward the transmission source node SXC33 of the second LSP 42 (Step S51).

On the other hand, when each of the intermediate nodes OXC34 to OXC36 of the second LSP 42 which has transmitted the signaling 53 for the setting of the LSP 42 toward its subsequent node OXC on the path at the above-described Step S55 receives the signaling 55 which notifies the completion of the setting of the second LSP 42 from the destination node SXC37 (Step S56), it registers and manages the LSP attribute information of the second LSP 42 in its own node and transmits the signaling 55 which notifies the completion of the setting of the second LSP 42 toward the transmission source node SXC33 of the second LSP 42 (Step S57).

In addition, when the transmission source node SXC33 which has transmitted the signaling 53 for the setting of the second LSP 42 toward the subsequent node OXC34 on the path at the above-described Step S61 receives the signaling 55 which notifies the completion of the setting of the second LSP 42 from the subsequent node OXC 34 (Step S62 in FIG. 7), the transmission source node SXC33 confirms the first LSP 41 setting completion information added to register and manage the LSP attribute information of the first LSP 41 and the LSP attribute information of the second LSP 42 in its own node (Step S63) and in order to make the second LSP 42 be a virtual link between the transmission source node SXC33 of the second LSP 42 and the destination node SXC37 of the second LSP 42, manages an output port, a time slot of the transmission source node SXC33 of the second LSP 42 and an input port, a time slot of the destination node SXC37 of the second LSP 42 together with the ID of the LSP 42 (Step S64) and transmits signaling 54 which notifies that the first LSP 41 uses the second LSP 42 as a link between the SXC33 and the SXC37 and that setting of the first LSP 41 is completed toward the transmission source node SXC31 of the first LSP 41 along the path (Step S65).

When the intermediate node SXC32 of the first LSP 41 which has transmitted the signaling 52 for the setting of the LSP 41 toward the subsequent node SXC33 on the path at the above-described Step S55 receives the signaling 54 which notifies the completion of the setting of the first LSP 41 from the subsequent node SXC33 (Step S56), the node SXC32 registers and manages the LSP attribute information of the first LSP 41 in its own node and transmits the signaling 54 which notifies the completion of the setting of the first LSP 41 toward the transmission source node SXC31 of the first LSP 41 (Step S57).

Then, when the transmission source node SXC31 of the first LSP 41 which has started the signaling 52 for setting the first LSP 41 along the obtained path at the above-described Step S38 receives the signaling 54 which notifies that the setting of the first LSP 41 is completed from the node SXC32 (Step S39 in FIG. 5), setting of an end-to-end path from the transmission source client 39 to the destination client 40 is completed. In addition, the SXC33 advertises the second LSP 42 as a link between the SXC33 and the SXC37.

Figure 8:
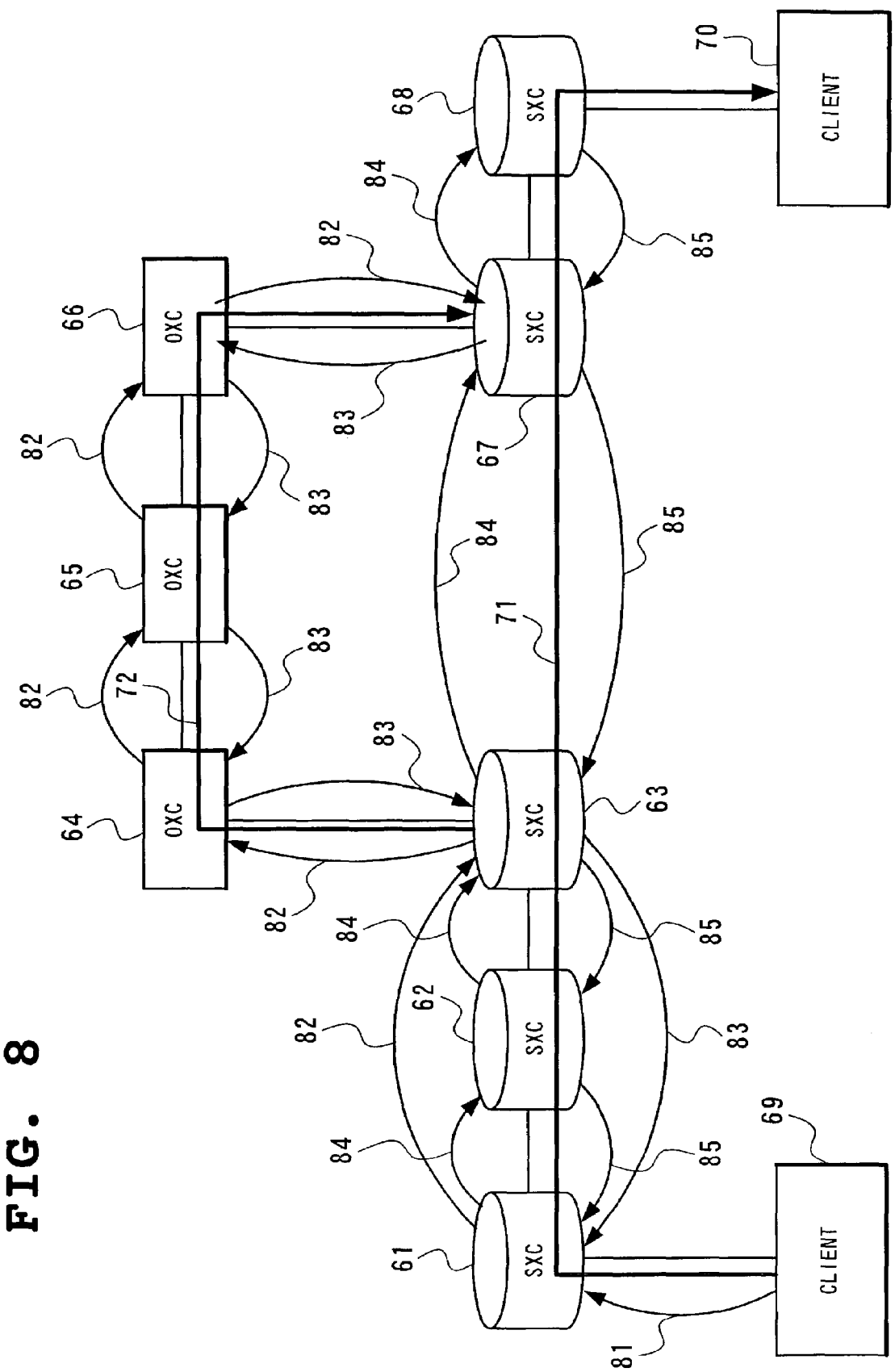
FIG. 8 is a structural diagram of a third mode of implementation of the communication network control system according to the present invention.

Next, a third mode of implementation of the present invention will be described. FIG. 8 is a structural diagram showing the third mode of implementation of the communication network control system according to the present invention. Each of nodes 61 to 68 which will be described later has the data base 212 (see FIG. 10 which will be described later) whose topology covers all the links of different attributes in the communication network similarly to the nodes 1 to 8 in the first mode of implementation.

First, features of the third mode of implementation will be described. While the third mode of implementation is the same as the second mode of implementation in comparing by a transmission source node between framing of an LSP 71 to be set and each of all switching granularities on the path (see Step S33 in FIG. 5), it differs from the second mode of implementation in failing to transmitting first LSP 71 setting information added to the signaling 53 for the setting of a second LSP 72 toward a subsequent node (see Steps S59 to 61 in FIG. 7). Similarly to the first mode of implementation, in the third mode of implementation, signaling for the setting of the first LSP 71 and signaling for the setting of the second LSP 72 are conducted separately.

On the other hand, the third mode of implementation differs from the first and second modes of implementation in that signaling 82 for setting the second LSP 72 is transmitted from the transmission source node SXC61 to the transmission source node SXC63 of the second LSP 72 after passing through the node SXC62 located midway and that signaling 83 which notifies that setting of the second LSP 72 is completed and that the second LSP 72 is a link between the SXC63 and the SXC67 is transmitted from the transmission source node SXC63 to the transmission source node SXC61 of the first LSP 71 after passing through the node SXC62 located midway.

Since major part of the operation of the third mode of implementation is thus common to those of the first and second modes of implementation, no flow chart will be shown with respect to the third mode of implementation.

With reference to FIG. 8, each of the nodes 61 to 68 constituting the communication network control system has a function of managing identifier, discrimination between input and output, band, switching granularity of a link as link attributes, a function of advertising the link attribute information within the network, a function of, upon a path setting request 81 from connected clients 69 and 70, using all the links in the network which have a band equal to or wider than that of a requested path to obtain a path whose metric (cost) is the minimum, a function of comparing a switching granularity of each of all the nodes on the path and a granularity of an LSP to be set and a function of, when determining that there exists a node whose switching granularity is larger than the granularity of the LSP to be set, designating the node in question as a transmission target node of a lower-order layer LSP.

Each node further has a function of obtaining a subsequent node on the path which can be switched on the granularity of the LSP to be set and designating the node as a destination node of a lower-order layer LSP, a function of designating a transmission target node and a destination node of an LSP in a further lower-order layer by the same means, a mechanism which explicitly indicates a transmission source node and the destination node of the lower-order LSP in the path information of the lower-order layer LSP, a function of transmitting, to the destination node of the lower-order LSP along the path, the path information of the lower-order layer LSP and information about a band and framing of the lower-order layer LSP, and a function of confirming path information of LSP setting information and when its own node is not in the path, forwarding the LSP setting information directly to the subsequent node without controlling its own node.

Each node further has a function of confirming the path information of the LSP setting information and when its own node is in the path, assigning a label to the LSP to be set according to transmitted information to control a cross-connect switch of its own node, a function of, upon receiving lower-order LSP setting information when designated as the destination node of the lower-order layer LSP, giving notification toward a transmission source node of a higher-order layer LSP that setting of the lower-order layer LSP is completed, and a function of, upon receiving lower-order layer LSP setting completion information when designated as a transmission target node of the lower-order layer LSP, managing information related to the lower-order layer LSP.

Each node further has a function of, upon receiving the lower-order layer LSP setting completion information when designated as a transmission target node of the higher-order layer LSP, generating path information of the higher-order layer LSP with the lower-order layer LSP as a link between the transmission target node and the destination node of the LSP, a function of transmitting the higher-order layer LSP path information and information about a band and framing of the higher-order layer LSP to a destination node of the higher-order LSP along the path, a function of, upon receiving higher-order layer LSP setting information when designated as the destination node of the higher-order layer LSP, giving notification toward the transmission source node of the higher-order layer LSP that setting of the higher-order layer LSP is completed, a function of, upon receiving the higher-order layer LSP setting completion information when designated as the transmission source node of the higher-order layer LSP, managing information related to the LSP, and a function of, if the LSP set has a free band for the higher-order layer path when designated as the transmission source node of the lower-order layer LSP, advertising the lower-order layer LSP as a link with the destination node of the LSP in question in the network.

Next, operation of the third mode of implementation shown in FIG. 8 will be described. In the figure, the transmission source node SXC61 having received the path setting request 81 of the STS-1 from the transmission source client 69 to the destination client 70 obtains a path whose metric (cost) is the minimum by using all the links in the network which have a band equal to or wider than that of the requested path.

Next, the transmission source node SXC61 compares the framing of the LSP 71 to be set and a switching granularity of each of all the nodes on the path to determine whether there exists a node which can not be switched by the framing of the LSP 71 to be set. Here, since the nodes OXC64 to OXC66 can not be switched on the granularity of the STS-1, determination is made that the lower-order layer LSP 72 should be set in the section between the nodes SXC63 to SXC67. Then, transmit the signaling 82 for setting the second LSP 72 whose path information has description of the section between the nodes SXC63 and SXC67 toward the transmission source node SXC63 of the second LSP 72.

On the other hand, the node SXC62 in the midway confirms the path information upon receiving the signaling for setting the second LSP 72 and transmits the signaling 82 for setting the second LSP 72 to the node SXC63 without controlling its own node because the node SXC62 fails to exist in the path.

Upon receiving the signaling 82 for setting the second LSP 72 from the transmission source node SXC61, the transmission source node SXC63 of the second LSP 72 confirms the path information and when determining that the node SXC63 is designated as a transmission source node of the second LSP 72, assigns free port, wavelength of a link existing between its own node and the subsequent node on the path to the second LSP 72, assigns an output label to the second LSP 72 and stores and manages the LSP ID and the label paired in the label management table 214, and depending on circumstances, sets a switch at the same time. Then, the node SXC63 transmits the signaling 82 for the setting of the LSP 72 toward the subsequent node on the path.

Upon receiving the signaling 82 for setting the LSP 72 transmitted from the node SXC63, the intermediate node OXC64 of the second LSP 72 confirms the path information and when determining that its own node is not a destination node of the second LSP 72, assigns free port, wavelength of a link existing between its own node and the subsequent node on the path to the second LSP 72, assigns an input label and an output label to the second LSP 72 and stores and manages the LSP ID and the labels paired in the label management table 214, and depending on circumstances, sets a switch at the same time. Then, transmit the signaling 82 for the setting of the LSP 72 toward the subsequent node SXC65 on the path.

The same processing as that executed by the node OXC64 is also conducted at the nodes OXC65 and OXC66.

Upon receiving the signaling 82 for setting the second LSP 72 transmitted from the node OXC66, the destination node SXC67 of the second LSP 72 confirms the path information and when determining that its own node is a destination node of the second LSP 72, assigns an input label to the second LSP 72, manages the LSP ID and the label paired, registers and manages the LSP attribute information of the second LSP 72 in its own node and transmits the signaling 83 which notifies completion of the setting of the second LSP 72 toward the transmission source node SXC63 of the second LSP 72 along the path.

Upon receiving the signaling 83 which notifies the completion of the setting of the second LSP 72, the intermediate node OXC66 of the second LSP 72 registers and manages the LSP attribute information of the second LSP 72 and transmits the signaling 83 which notifies that setting of the second LSP 72 is completed to the subsequent node OXC65. Similarly, the same signaling 83 is transmitted from the node OXC65 to the node OXC64 and from the node OXC64 to the node OXC63.

Upon receiving the signaling 83 notifying that setting of the second LSP 72 is completed which is transmitted from the node OXC64, the destination source node SXC63 of the second LSP 72 registers and manages the LSP attribute information of the second LSP 72 in its own node and in order to make the second LSP 72 be a virtual link between the transmission source node SXC63 of the second LSP 72 and the destination node SXC67 of the second LSP 72, manages an output port, a time slot of the transmission source node SXC63 of the second LSP 72 and an input port, a time slot of the destination node SXC67 of the second LSP 72 together with the ID of the LSP 72 and transmits the signaling 83 which notifies that the setting of the second LSP 72 is completed and that the second LSP 72 is a link between the SXC63 and the SXC67 toward the transmission source node SXC61 of the first LSP 71. The link information is stored and managed in the link attribute information storage region 211 on both sides of the transmission source node SXC63 of the second LSP 72 and the destination node SXC67 of the second LSP 72.

Upon receiving the signaling 83 which notifies that setting of the second LSP 72 is completed, the transmission source node SXC61 of the first LSP 71 generates path information of the first LSP 71 with the second LSP 72 as a link between the SXC63 and the SXC67, assigns free port, time slot of a link existing between its own node and the subsequent node SXC62 on the path to the first LSP 71, assigns an input label and an output label to the first LSP 71 and stores and manages the LSP ID and the labels paired in the label management table 214, and depending on circumstances, sets a switch at the same time.

Next, the transmission source node SXC61 transmits signaling 84 for setting the first LSP 71 toward the subsequent node SXC62 on the path along the obtained path (SXC61-SXC62-SXC63-SXC67-SXC68).

Upon receiving the signaling 84 for setting the first LSP71 transmitted from the transmission source node SXC61, the intermediate node SXC62 of the first LSP 71 confirms the path information and when determining that its own node is not a destination node of the first LSP 71, assigns free port, time slot of a link existing between its own node and the subsequent node SXC63 on the path to the first LSP 71, assigns an input label and an output label to the first LSP 71 and stores and manages the LSP ID and the labels paired in the label management table 214, and depending on circumstances, sets a switch at the same time. Then, transmit the signaling 84 for setting the LSP 71 toward the subsequent node SXC63 on the path.

Upon receiving the signaling 84 for setting the first LSP71 which is transmitted from the node SXC62, the node SXC63 of the first LSP 71 confirms the path information and when determining that its own node is not a destination node of the first LSP 71, assigns free port, time slot of the link LSP 72 existing between its own node and the subsequent node SXC67 on the path to the first LSP 71, assigns an input label and an output label to the first LSP 71 and stores and manages the LSP ID and the labels paired in the label management table 214, and depending on circumstances, sets a switch at the same time. Then, transmit the signaling 84 for setting the LSP 71 toward the subsequent node SXC67 on the path.

Upon receiving the signaling 84 for setting the first LSP71 which is transmitted from the node SXC63, the intermediate node SXC67 of the first LSP 71 confirms the path information and when determining that its own node is not a destination node of the first LSP 71, assigns free port, time slot of a link existing between its own node and the subsequent node SXC68 on the path to the first LSP 71, assigns an input label and an output label to the first LSP 71 and stores and manages the LSP ID and the labels paired in the label management table 214, and depending on circumstances, sets a switch at the same time. Then, the node SXC67 transmits the signaling 84 for setting the LSP 71 toward the subsequent node SXC68 on the path.

Upon receiving the signaling 84 for setting the first LSP71 which is transmitted from the node SXC67, the destination node SXC68 of the first LSP 71 confirms the path information and when determining that its own node is a destination node of the first LSP 71, assigns a port, a time slot to be connected to the destination client 70 designated by the LSP 71 setting information to the first LSP 71, assigns an input label and an output label to the first LSP 71, stores and manages the LSP ID and the labels paired in the label management table 214 and sets a switch at the same time. Then, the destination node SXC68 registers and manages the LSP attribute information of the first LSP 71 in its own node and transmits signaling 85 which notifies that setting of the first LSP 71 is completed toward the transmission source node SXC61 of the first LSP71 along the path.

Upon receiving the signaling 85 notifying that the setting of the first LSP 71 is completed which is transmitted from the destination node SXC68, the intermediate nodes SXC67, SXC63 and SXC62 of the first LSP 71 register and manage the LSP attribute information of the first LSP 71 in their own nodes and transmit the signaling 85 which notifies that setting of the first LSP 71 is completed toward the transmission source node SXC61 of the first LSP 71.

When the transmission source node SXC61 of the first LSP 71 receives the signaling 85 which notifies that setting of the first LSP 71 is completed, setting of an end-to-end path from the transmission source client 69 to the destination client 70 is completed. In addition, the SXC63 advertises the second LSP 72 between the SXC63 and SXC67 as an FA link.

Figure 9:
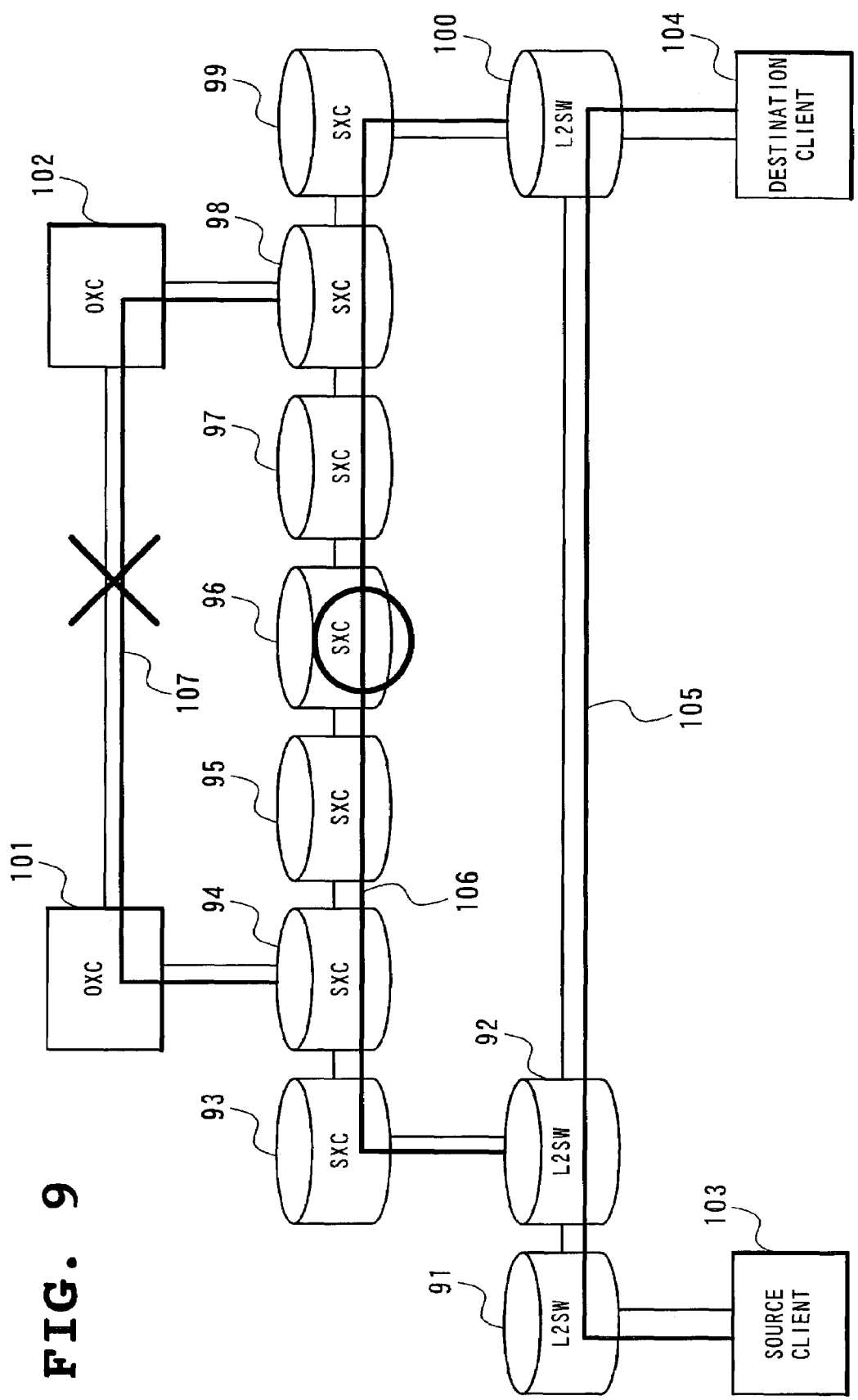
FIG. 9 is a structural diagram of a fourth mode of implementation of the communication network control system according to the present invention.

Next, a fourth mode of implementation will be described. FIG. 9 is a structural diagram showing the fourth mode of implementation of the communication network control system according to the present invention. Each of nodes 91 to 100 which will be described later has the data base 212 (see FIG. 10 which will be described later) whose topology covers all the links of different attributes in the communication network similarly to the nodes 1 to 8 in the first mode of implementation.

In the figure, OXC represents a wavelength cross-connect, SXC represents a SONET cross-connect and L2SW represents an ATM (Asynchronous Transfer Mode) cross connect, and it is assumed that OXC conducts switching on OC-48, SXC conducts switching on STS-1, L2SW conducts switching on an ATM cell basis and that a link band between SXC and SXC, between SXC and OXC and between OXC and OXC is 2.4 Gb/s and a link band between L2SW and L2SW and between L2SW and SXC is 150 Mb/s.

Each node has a function of, upon a path setting request from connected clients 103 and 104, obtaining a path whose metric (cost) is the minimum by using a node which has a band equal to or wider than that of a requested path and whose switching granularity is not more than a certain switching granularity. In addition, a method of discriminating and setting a section in which a lower-order layer LSP is to be set is assumed to be any of those described in the above first to third modes of implementation.

Since major part of the operation of the fourth mode of implementation is thus common to those of the first to third modes of implementation, no flow chart will be shown with respect to the fourth mode of implementation.

Next, operation of the fourth mode of implementation will be described. Assume that when each node conducts path calculation, it obtains a path whose metric (cost) is the minimum by using nodes which have a band equal to or wider than that of a requested path and whose switching granularity is not more than that of STS-1.

First, when a request for setting a 1.5 Mb/s path to the client 104 connected to the node L2SW100 is made from the client 103 connected to the node L2SW91 to the node L2SW91, the L2WS91 obtains a path to the node L2SW100 whose metric (cost) is the minimum by using a node which has a band not less than 1.5 Mb/s and whose switching granularity is not more than that of the STS-1.

Obtained accordingly is not a path of L2SW91-L2SW92-SXC93-SXC94-OXC101-OXC102-SXC98-SXC99-L2SW100 but a path of L2SW91-L2SW92-SXC93-SXC94-SXC95-SXC96-SXC97-SXC98-SXC99-L2SW100.

Then, according to the lower-order layer LSP setting method described in the first to third modes of implementation of the present invention, set up an LSP 106 of the STS-1 between the L2SW92 and the L2SW100 and with the LSP 106 as a link between the L2SW92 and the L2SW100, set up an LSP 105 between the nodes L2SW91 and L2SW100.

In the above-described modes of implementation, as a method of putting limitations on path calculation, the number of successive hops may be limited to use a node whose switching granularity is not less than a certain value as a path.

As another method of putting limitations on path calculation, it is possible to assign, to each node in the network, an ID for identifying an area to which each node belongs and use the ID to limit an area.

As a further method of putting limitations on path calculation, it is possible to assign, to each node in the network, an ID for identifying an attribute of a node and use the ID to limit a node attribute.

Next, a fifth mode of implementation will be described. The fifth mode of implementation relates to a program for causing a computer to execute a communication network control method. Each node described in the first to fourth modes of implementation has a program for causing a computer to execute the processing shown in the flow charts of FIGS. 2, 3, 5, 6 and 7. More specifically, a computer (switch controller which will be described later) in the node reads a program stored in a memory (not shown) in the node to control its own node according to the program. Since the control has been described, no further description will be made.

EMBODIMENT

Figure 10:
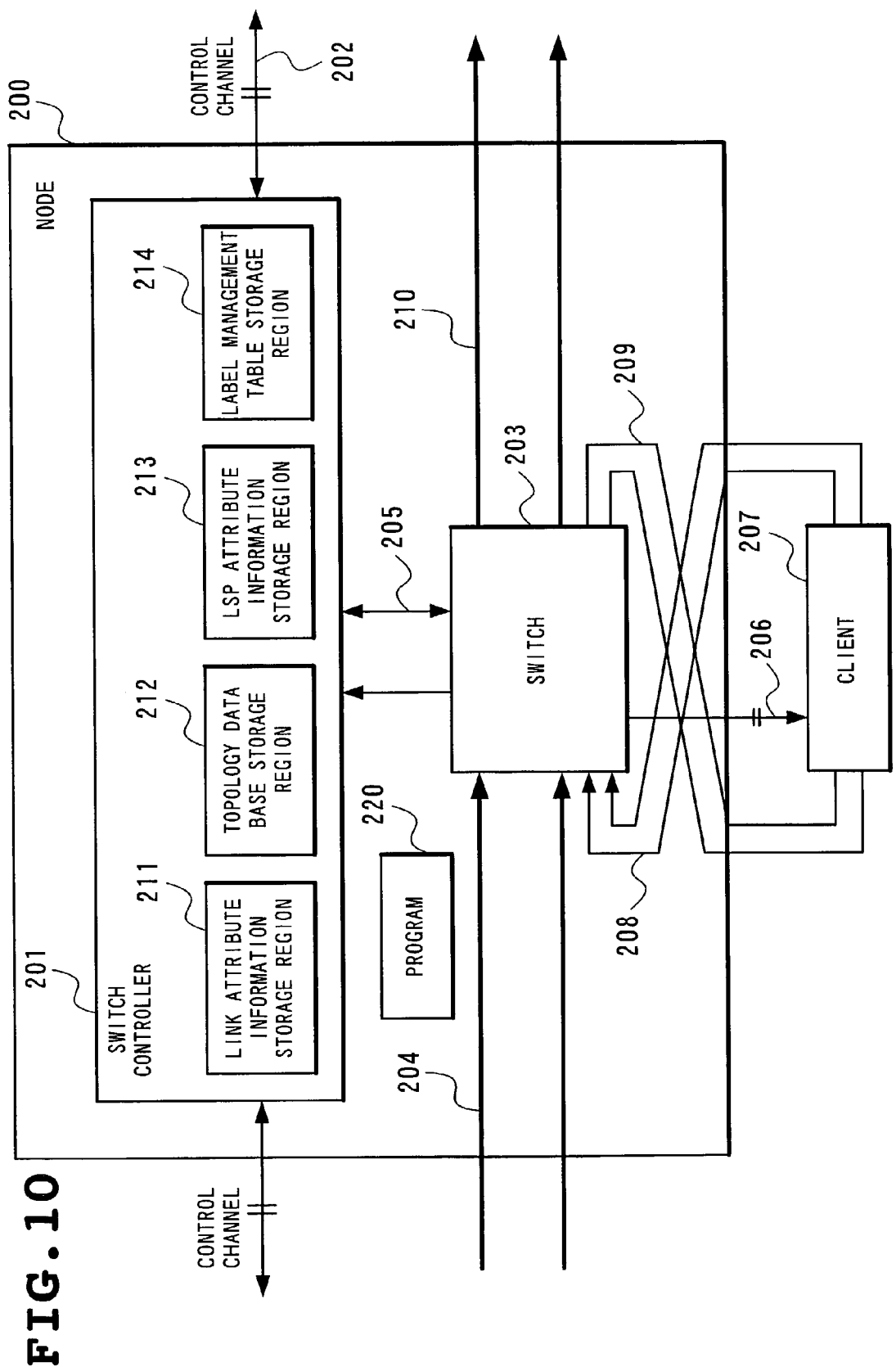
FIG. 10 is a structural diagram showing one example of a node in the first to fourth modes of implementation.

In the following, embodiments of nodes constituting the communication network control system according to the present invention will be described. First, a first embodiment will be described. The first embodiment is an embodiment of the node in the above-described first mode of implementation. FIG. 10 is a structural diagram showing one example of the node in the first to fourth modes of implementation. With reference to the figure, a node 200 includes a switch controller 201, a cross-connect switch 203 and a program 220 for causing a computer to execute the processing shown in the flow charts of FIGS. 2, 3, 5 and 6, and the node 200 is connected to a client 207.

The switch controller 201 includes a storage region 211 for storing link attribute information, a storage region 212 for storing a topology data base, a storage region 213 for storing LSP attribute information and a storage region 214 for storing a label management table. In the following description, the link attribute information will be represented as 211, the topology data base as 212, the LSP attribute information as 213 and the label management table as 214 for the sake of explanation.

The switch controller 201 has a function of managing such link attribute information 211 as an identifier, distinction between input and output, band, switching granularity of links 204 and 210, a function of transferring the link attribute information 211 to the switch controller of an adjacent node through a control channel 202 in order to advertise the information within the network, a function of setting up the topology data base 212 from link attribute information collected from other nodes in the network, and a function of, upon a path setting request made by the connected client 207 through a client control channel 206, obtaining a path whose metric (cost) is the minimum by using all the links in the network which have a band equal to or wider than that of a requested path based on the topology data base 212.

The switch controller further has a function of transferring obtained path information and LSP setting information including information about LSP band and framing to the switch controller of its adjacent node through the control channel 202, a function of assigning a label to an LSP to be set according to transmitted LSP setting information and controlling the cross-connect switch 203 of its own node, and a function of managing correspondence between an identifier of an LSP and an input label/an output label assigned to the LSP as the label management table 214.

The switch controller further has a function of comparing a switching granularity of a subsequent node on the path and a granularity of an LSP to be set based on the link attribute information 211 and the LSP setting information, a function of, when determining that the switching granularity of the subsequent node is larger than the granularity of the LSP to be set, obtaining a subsequent node which can be switched on the granularity of the LSP to be set based on the path information and the topology data base 212 and setting the obtained node as a destination node of an LSP in a lower-order layer, and a function of transferring the LSP setting information including information about a band and framing of an LSP in a lower-order layer which can be switched by a subsequent node to the switch controller of an adjacent node through the control channel 202 in order to transmit the information to the destination node along the path.

The switch controller further has a function of, upon receiving the LSP setting information when its own node is a destination node, in order to give notification that LSP setting is completed toward a transmission source node, transferring the notification to the switch controller of an adjacent node through the control channel 202, a function of, upon receiving LSP setting completion information when its own node is a transmission source node, managing the relevant LSP attribute information 213, a function of, when its own node is a transmission source node, if the LSP set is an LSP in a lower-order layer and has a free band for a path of a higher-order layer, managing the link attribute information 211 with the LSP of the lower-order layer in question as a link with a destination node of the LSP in question in the network, and a function of advertising the link attribute information 211 in question through the control channel 202.

Next, a second embodiment will be described. The second embodiment is an embodiment of the node in the above-described second mode of implementation. With reference to FIG. 10, the switch controller 201 has a function of managing such link attribute information 211 as an identifier, distinction between input and output, band, switching granularity of the links 204 and 210, a function of transferring the link attribute information 211 to the switch controller of an adjacent node through the control channel 202 in order to advertise the information within the network, a function of setting up the topology data base 212 from link attribute information collected from other nodes in the network, and a function of, upon a path setting request made by the connected client 207 through the client control channel 206, obtaining a path whose metric (cost) is the minimum by using all the links in the network which have a band equal to or wider than that of a requested path based on the topology data base 212.

The switch controller further has a function of comparing a switching granularity of each of all the nodes on the path and a granularity of an LSP to be set based on the topology data base 212 and LSP setting information, a function of, when determining that there exists a node whose switching granularity is larger than the granularity of the LSP to be set, designating the node as a transmission target node of a lower-order layer LSP, and a function of obtaining a subsequent node on the path which can conduct switching on the granularity of the LSP to be set based on the topology data base 212 and the LSP setting information and designating the node as a destination node of the lower-order layer LSP.

The switch controller further has a function of designating a transmission target node and a destination node of an LSP in a further lower-order layer by the same means, a function of explicitly indicating the transmission target node and the destination node of the lower-order LSP in the path information, a function of transferring obtained path information and LSP setting information such as information about LSP band and framing to the switch controller of an adjacent node through the control channel 202 in order to transmit the information to a destination node along the path, a function of assigning a label to the LSP to be set according to transmitted LSP setting information and controlling the cross-connect switch 203 of its own node, and a function of managing correspondence between an identifier of the LSP and an input label/an output label assigned to the LSP as the label management table 214.

The switch controller further has a function of, when its own node is designated as a transmission target node of a lower-order layer LSP, adding higher-order layer LSP setting information to lower-order layer LSP setting information, a function of transferring LSP setting information such as information about a band and framing of a lower-order layer LSP to the switch controller of an adjacent node through the control channel 202 in order to transmit the information to a destination node of the lower-order layer LSP along the path and a function of, upon receiving lower-order layer LSP setting completion information when its own node is a transmission target node of the lower-order layer LSP, taking out higher-order layer LSP setting completion information added to the received information and transferring the taken out higher-order layer setting completion information to the switch controller of an adjacent node through the control channel 202 in order to transmit the information to a transmission target node of the higher-order layer LSP.

The switch controller further has a function of, upon receiving lower-order layer LSP setting information when its own node is a destination node of a lower-order layer LSP, taking out higher-order layer LSP setting information added to the received information and transferring the taken out information to the switch controller of an adjacent node through the control channel 202 in order to transmit the higher-order layer setting information to a destination node of a higher-order layer LSP, and a function of, upon receiving the higher-order layer LSP setting completion information when its own node is a destination node of the lower-order layer LSP, adding the information to the lower-order layer LSP setting completion information and transferring the obtained information to the switch controller of an adjacent node through the control channel 202 in order to transmit the obtained information to a transmission target node of the lower-order layer LSP along the path.

The switch controller has a function of, upon receiving the higher-order layer LSP setting information when its own node is a destination node of a higher-order layer LSP, transferring the information to the switch controller of an adjacent node through the control channel 202 in order to give notification toward the transmission source node of the higher-order layer LSP that the setting of the higher-order layer LSP is completed, a function of, upon receiving the LSP setting completion information when its own node is a transmission source node, managing the LSP attribute information 213, a function of, when its own node is a transmission source node, if the LSP set is a lower-order layer LSP and has a free band for a higher-order layer path, managing the link attribute information 211 with the lower-order layer LSP in question as a link with a destination node of the LSP in the network, and a function of advertising the link attribute information 211 through the control channel 202.

Next, a third embodiment will be described. The third embodiment is an embodiment of the node in the above-described third mode of implementation. With reference to FIG. 10, the switch controller 201 has a function of managing the link attribute information 211 such as identifier, discrimination between input and output, band, switching granularity of the links 204 and 210, a function of transferring the link attribute information 211 to the switch controller of an adjacent node through the control channel 202 in order to advertise the information within the network, a function of setting up the topology data base 212 based on link attribute information collected from other nodes in the network, and a function of, upon a path setting request made by the connected client 207 through the client control channel 206, obtaining a path whose metric (cost) is the minimum by using all the links in the network which have a band equal to or wider than that of a requested path based on the topology data base 212.

The switch controller further has a function of comparing a switching granularity of each of all the nodes on the path and a granularity of an LSP to be set based on the topology data base 212 and LSP setting information, a function of, when determining that there exists a node whose switching granularity is larger than the granularity of the LSP to be set, designating the node in question as a transmission target node of a lower-order layer LSP, a function of obtaining a subsequent node on the path which can be switched on the granularity of the LSP to be set based on the topology data base 212 and the LSP setting information and designating the node as a destination node of the lower-order layer LSP, and a function of designating a transmission target node and a destination node of an LSP in a further lower-order layer by the same means.

The switch controller further has a function of explicitly indicating a transmission source node and a destination node of a lower-order layer LSP in path information of the lower-order layer LSP, a function of transferring, to the switch controller of an adjacent node through the control channel 202, lower-order layer LSP path information and LSP setting information such as a band and framing of a lower-order layer LSP in order to transmit the information to a destination node of the lower-order LSP along the path, and a function of confirming path information of the LSP setting information and when its own node is not in the path, transferring the LSP setting information directly to the switch controller of an adjacently subsequent node through the control channel 202 without controlling its own node.

The switch controller further has a function of confirming the path information of the LSP setting information and when its own node is in the path, assigning a label to the LSP to be set according to transmitted information to control the cross-connect switch 203 of its own node, a function of managing correspondence between an identifier of an LSP and an input label/an output label assigned to the LSP as the label management table 214, a function of, upon receiving lower-order LSP setting information when its own node is designated as a destination node of a lower-order layer LSP, in order to give notification toward a transmission source node of the higher-order layer LSP that setting of the lower-order layer LSP is completed, transferring the information to the switch controller of an adjacent node through the control channel 202, and a function of, upon receiving lower-order layer LSP setting completion information when its own node is designated as a transmission target node of the lower-order layer LSP, managing the LSP attribute information 213 of the lower-order layer.

The switch controller further has a function of, upon receiving the lower-order layer LSP setting completion information when its own node is a transmission source node of a higher-order layer LSP, generating path information of the higher-order layer LSP with the lower-order layer LSP in question as a link between a transmission target node and a destination node of the LSP in question, a function of managing the link in the link attribute information 211, and a function of transferring the higher-order layer LSP path information and the LSP setting information such as a band and framing of the higher-order layer LSP to the switch controller of an adjacent node through the control channel 202 in order to transmit the information to the destination node of the higher-order LSP along the path.

The switch controller further has a function of, upon receiving the higher-order layer LSP setting information when its own node is a destination node of a higher-order layer LSP, transferring the information to the switch controller of an adjacent node through the control channel 202 in order to give notification toward a transmission source node of the higher-order layer LSP that setting of the higher-order layer LSP is completed, a function of, upon receiving the higher-order layer LSP setting completion information when designated as a transmission source node of the higher-order layer LSP, managing the relevant LSP attribute information 213, a function of, when designated as a transmission source node of a lower-order layer LSP, if the LSP set has a free band for the higher-order layer path, managing the link attribute information 211 with the lower-order layer LSP as a link with the destination node of the LSP in question in the network, and a function of advertising the link attribute information 211 through the control channel 202.

Next, a fourth embodiment will be described. The fourth embodiment is an embodiment of the node in the above-described fourth mode of implementation. With reference to FIG. 10, the switch controller 201 has a function of, upon a path setting request made by the connected client 207 through the client control channel 206, obtaining a path whose metric (cost) is the minimum by using a node in the network which has a band equal to or wider than that of a requested path and whose granularity is not more than a certain switching granularity based on the topology data base 212.

Method of discriminating and setting a section in which a lower-order layer LSP is to be set is assumed to be any of the methods described with respect to the first to third modes of implementation.

Figure 11:
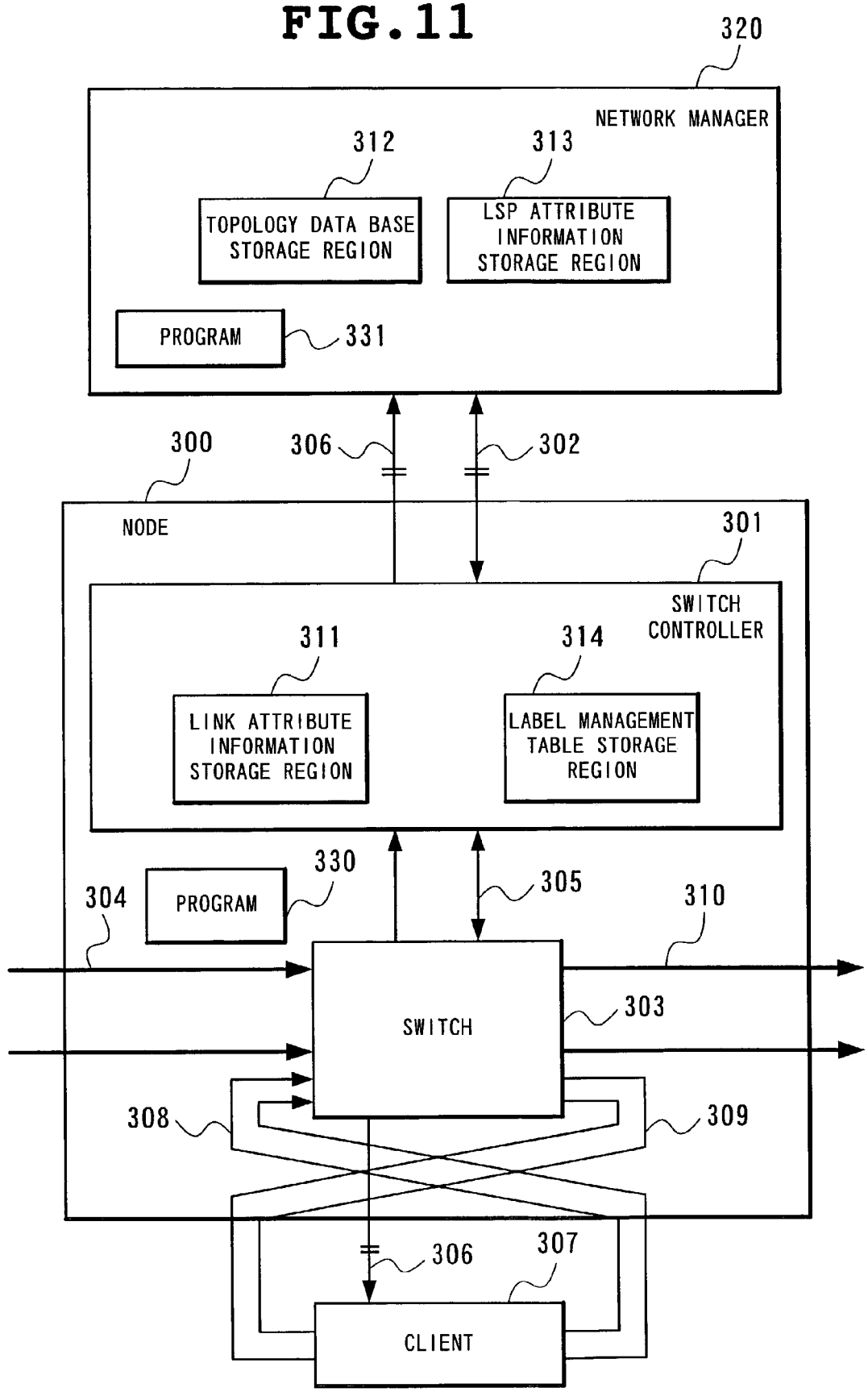
FIG. 11 is a structural diagram showing another example of a node.

Next, a fifth embodiment will be described. The fifth embodiment relates to another example of the nodes constituting the communication network control system according to the present invention. FIG. 11 is a structural diagram of another example of the node. With reference to the figure, the communication network control system includes a node 300 and a network manager 320.

The node 300 includes a switch controller 301, a cross-connect switch 303 and a program 330 for causing a computer to execute the processing shown in the flow charts of FIGS. 2, 3, 5, 6 and 7, and the node 300 is connected to a client 307.

In addition, the switch controller 301 includes a storage region 311 for storing link attribute information and a storage region 314 for storing a label management table.

The network manager 320 includes a storage region 312 for storing a topology data base, a storage region 313 for storing LSP attribute information and a program 331 having the same contents as those of the program 330. In the following description, the link attribute information will be represented as 311, the topology data base as 312, the LSP attribute information as 313 and the label management table as 314 for the sake of explanation.

The switch controller 301 of the node 300 has a function of managing the link attribute information 311 such as identifier, discrimination between input and output, band, switching granularity of links 304 and 310, a function of transferring the link attribute information 311 to the network manager 320 through a control channel 302, a function of, upon receiving LSP setting information from the network manager 320 through the control channel 302, assigning a label to an LSP to be set according to the transmitted information to control the cross-connect switch 303 of its own node and a function of managing correspondence between an identifier of an LSP and an input label/an output label assigned to the LSP as the label management table 314.

On the other hand, the network manager 320 for generalizing and managing the entire network has a function of setting up the topology data base 312 based on link attribute information collected from nodes in the network, a function of, upon a path setting request made from the client 307 through a client control channel 306, obtaining a path whose metric (cost) is the minimum by using all the links in the network which have a band equal to or wider than that of a requested path based on the topology data base 312, a function of discriminating and setting a section in which a lower-order layer LSP is to be set, a function of transmitting LSP setting information to the switch controller 301 of each node on the path through the control channel 302, and a function of managing the set LSP attribute information 213.

Method of discriminating and setting a section in which a lower-order layer LSP is to be set by the network manager 320 is assumed to be any of the methods described with respect to the first to third modes of implementation.

Since in the communication network control system according to the present invention, each of nodes constituting the communication network has a data base whose topology covers links in the communication network and the system includes a path calculation means for, when its own node is a transmission source node, referring to the data base to obtain a route to a destination node and a route information transmitting means for, in order to transmit the route and information related to the route to the destination node along a route when its own node is a transmission source node or an intermediate node, transmitting the information to an adjacent node, network resources can be efficiently used at the time of setting a first path from a transmission source node to a destination node.

In addition, the communication network control method, the node and the program according to the present invention produce the same effects attained by the above-described communication network control system.

The present invention further enables a shortest first path to be obtained irrespectively of whether a second path which can accommodate the first path exists or not by setting up a data base covering all the links of different attributes which constitute the network and forming route information which is about a path whose metric (cost) is the minimum and in which link attributes are described by using the data base.

Having a means for, at the time of setting a first path, confirming an attribute of a link managed by each node on a route of the first path and when determining that an attribute of a link managed by a certain node is different from an attribute of a link managed by a transmission source node, discriminating a node which exists closer to a destination node on the route of the first path than the discriminated node and which has the same attribute as that of the link managed by the transmission source node, the present invention enables determination to be made that setting of a second path which can accommodate the first path is necessary.

According to the present invention, when a route of a first path is selected, by confirming an attribute of a link managed by each node on the route and comparing the link attribute with an attribute of a link managed by a transmission source node of the first path, it is possible to determine that setting of a second path which can accommodate the first path is necessary and to determine a transmission source node of the second path.

According to the present invention, after selecting a route of a first path from a transmission source node to a destination node, at the time of setting each node along the route of the first path, by confirming an attribute of a link managed by each node and comparing the attribute with an attribute of a link managed by the transmission source node of the first path, it is possible to determine that setting of a second path which can accommodate the first path is necessary and to determine a transmission source node of the second path. According According to the present invention, after determining that setting of a second path which can accommodate a first path is necessary at the selection of a route of the first path, by confirming an attribute of a link managed by each node which is on the route of the first path and exists closer to a destination node of the first path than a transmission source node of the second path and comparing the attribute with an attribute of a link managed by a transmission source node of the first path, it is possible to discriminate a destination node of the second path which can accommodate the first path.

According to the present invention, after determining that setting of a second path which can accommodate a first path is necessary during setting of a node for the setting of the first path, by checking a link management data base to confirm an attribute of a link managed by each node which is on the route of first path and exists closer to a destination node of the first path than a transmission source node of the second path and comparing the attribute with an attribute of a link managed by a transmission source node of the first path, it is possible to discriminate a destination node of the second path which can accommodate the first path.

According to the present invention, after determining that setting of a second path which can accommodate a first path is necessary during setting of a node for the setting of the first path, at the time of setting of the second path conducted by each node along the route of the first path, by confirming an attribute of a link managed by each node and comparing the attribute with an attribute of a link managed by a transmission source node of the first path, it is possible to discriminate a destination node of the second path which can accommodate the first path.

In a distributed control communication network formed of a plurality of links of different attributes, the present invention enables a first path and a second path which can accommodate the first path to be set by, at the time when a transmission source node of the first path determines that setting of the second path which can accommodate the first path is necessary, transmitting second path setting information from the transmission source node of the first path to transfer the information from a transmission source node to a destination node of the second path along the route of the second path, so that each node on the route of the second path which has received the second path setting information conducts setting of its own node in order to set the second path, and with the second path as a virtual link between the transmission source node and the destination node of the second path, transfers first path setting information from the transmission source node of the first path to a destination node of the first path along the route of the first path, and each node on the first path route which has received the first path setting information conducts setting of its own node in order to set the first path.

In a distributed control communication network formed of a plurality of links of different attributes, the present invention enables a first path and a second path which can accommodate the first path to be set by, at the time when a transmission source node of the first path determines that setting of the second path which can accommodate the first path is necessary, adding second path setting information to first path setting information and transferring the first path setting information from the transmission source node of the first path to a transmission source node of the second path along the route of the first path, so that each node which has received the first path setting information conducts setting of its own node in order to set the first path and transfers the second path setting information from the transmission source node to a destination node of the second path along the route of the second path, each node which has received the second path setting information conducts setting of its own node in order to set the second path and with the second path as a virtual link between the transmission source node to the destination node of the second path, transfers the first path setting information from the destination node of the second path to a destination node of the first path along the route of the first path, and each node having received the first path setting information conducts setting of its own node in order to set the first path.

In a distributed control communication network formed of a plurality of links of different attributes, the present invention enables a first path and a second path which can accommodate the first path to be set by, transferring first path setting information from a transmission source node to a destination node of the first path along the route of the first path, so that a node having received the first path setting information conducts setting of its own node for the setting of the first path and makes determination for the setting of the second path which can accommodate the first path according to claim 4 and when determining that setting of the second path is necessary, transfers second path setting information to a destination node of the second path along the route of the first path, each node which has received the second path setting information conducts setting of its own node in order to set the second path and after setting the second path, with the second path as a virtual link between a transmission source node to the destination node of the second path, transfers the first path setting information from the destination node of the second path to the destination node of the first path along the route of the first path, and each node having received the first path setting information conducts setting of its own node in order to set the first path.

In a distributed control communication network formed of a plurality of links of different attributes, the present invention enables a first path and a second path which can accommodate the first path to be set by, transferring first path setting information from a transmission source node to a destination node of the first path along the route of the first path, so that a node having received the first path setting information conducts setting of its own node for the setting of the first path and makes determination for the setting of the second path which can accommodate the first path according to claim 4 and when determining that setting of the second path is necessary, transfers second path setting information to a destination node of the second path along the route of the first path, each node which has received the second path setting information conducts setting of its own node in order to set the second path and sets the second path, and at the same time, with the second path as a virtual link between a transmission source node to the destination node of the second path, transfers the first path setting information from the destination node of the second path to the destination node of the first path along the route of the first path, and each node having received the first path setting information conducts setting of its own node in order to set the first path.

In a distributed control communication network formed of a plurality of links of different attributes, the present invention enables a first path and a second path which can accommodate the first path to be set by, transferring first path setting information from a transmission source node to a destination node of the first path along the route of the first path, so that a node having received the first path setting information conducts setting of its own node for the setting of the first path and makes determination for the setting of the second path which can accommodate the first path according to claim 4 and when determining that setting of the second path is necessary, transfers second path setting information with the first path setting information added to a destination node of the second path along the route of the first path, each node which has received the second path setting information conducts setting of its own node in order to set the second path and sets the second path, after the second path is set, with the second path as a virtual link between a transmission source node and the destination node of the second path, the destination node of the second path having received the second path setting information transfers the first path setting information added to the second path setting information to the destination node of the first path along the route of the first path, and each node having received the first path setting information conducts setting of its own node in order to set the first path.

In a communication network formed of a plurality of links of different attributes, the present invention automatically prevents setting of a second path which can accommodate a first path at a link of a certain attribute by at the time of route calculation, dividing the communication network into networks grouped on the basis of a link of a different attribute and obtaining a route whose metric (cost) is the minimum by using only networks of a certain group.

In a communication network formed of a plurality of links of different attributes, the present invention automatically prevents setting of a second path which can accommodate a first path when the number of its hops exceeds a certain value by at the time of route calculation, obtaining a route whose metric (cost) is the minimum with the number of successive hops limited in a case of making a link of a certain attribute be a route.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A communication network system formed of a plurality of links of different attributes, comprising:
   means for,
   when transferring communication data from a transmission source to a destination node by using a first path, at the time of the selection of a route to the destination node conducted by said transmission source node, setting up a data base covering all the links of different attributes and generating information of a route whose metric (cost) is the minimum and in which information link attributes are described by using the data base, and
   at the time of setting said first path based on the route information, confirming an attribute of a link managed by each node on the first path route and when determining that an attribute of a link managed by a first node is different from an attribute of a link managed by the transmission source node, discriminating a second node which exists closer to the destination node than the first node on the route of the first path and which has the same attribute as the attribute of the link managed by the transmission source node, and
   means for determining that setting of a second path which can accommodate the first path from said first node to the second node is necessary and setting the second path.

2. A communication network system formed of a plurality of links of different attributes, comprising:
   means for, when transferring communication data from a transmission source node to a destination node by using a first path, at the time of setting the first path, confirming an attribute of a link managed by each node on the first path route and when determining that an attribute of a link managed by a first node is different from an attribute of a link managed by the transmission source node, discriminating a second node which exists closer to the destination node than the first node on the route of the first path and which has the same attribute as the attribute of the link managed by the transmission source node, and
   means for determining that setting of a second path which can accommodate the first path from the first node to the second node is necessary.

3. The communication network system as set forth in claim 2, wherein said means for determining that setting of the second path is necessary, when the first path route from the transmission source node to the destination node is selected, confirms an attribute of a link managed by each node on the first path route and when determining that the attribute of the link managed by the first node is different from the attribute of the link managed by the transmission source node, determines that setting of the second path which can accommodate the first path from said first node is necessary.

4. The communication network system as set forth in claim 2, wherein after the route of the first path from the transmission source node to the destination node is selected, said means for determining that setting of the second path is necessary confirms an attribute of a link managed by each node at the time of setting each node along the first path route and when determining that the attribute of the link managed by the first node is different from the attribute of the link managed by the transmission source node, determines that setting of the second path which can accommodate the first path from said first node is necessary.

5. The communication network system as set forth in claim 2, wherein for the discrimination of a second node of the second path, when selecting the route of the first path from the transmission source node to the destination node, an attribute of a link managed by each node on the route of the first path is confirmed to discriminate the second node existing closer to the destination node than the first node on the route of the first path and having the same attribute as the attribute of the link managed by the transmission source node.

6. The communication network system as set forth in claim 2, wherein for the discrimination of a second node of the second path, after determining that setting of the second path is necessary, the second node is discriminated which exists closer to the destination node than the first node on the route of the first path and has the same attribute as the attribute of the link managed by the transmission source node by checking a link management data base.

7. The communication network system as set forth in claim 2, wherein for the discrimination of a second node of the second path, after determining that setting of the second path is necessary, an attribute of a link managed by each node is confirmed at the time of setting for the second path conducted in each node along the route of the first path to discriminate the second node having the same attribute as the attribute of the link managed by the transmission source node.

8. A distributed control communication network formed of a plurality of links of different attributes, comprising
   path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein
   said path setting means
   when determination is made at the transmission source node of the first path that setting of the second path which can accommodate the first path is necessary, transmits second path setting information from the transmission source node to transfer the information from the first node as a transmission source to the second node as a destination of the second path along the route of the second path, so that each node on the route of the second path which has received the second path setting information conducts setting of its own node for setting the second path, thereby setting the second path between the first node and the second node, and with the second path as a virtual link between the first node and the second node, transfers first path setting information from the transmission source node to the destination node of the first path along the route of the first path, so that each node on the route of the first path which has received the first path setting information conducts setting of its own node for setting the first path, thereby setting the first path between the transmission source node and the destination node.

9. A distributed control communication network formed of a plurality of links of different attributes, comprising path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein said path setting means when determination is made at the transmission source node of the first path that setting of the second path which can accommodate the first path is necessary, adds second path setting information to first path setting information and transfers the first path setting information from the transmission source node of the first path to the first node as a transmission source of the second path along the route of the first path, so that each node on the route of the first path between the transmission source node and the first node which has received the first path setting information conducts setting of its own node for setting the first path, and transfers the second path setting information from the transmission source node of the second path to the second node as a destination along the route of the second path, so that each node on the route of the second path which has received the second path setting information conducts setting of its own node for setting second path, thereby setting the second path between the first node and the second node, and with the second path as a virtual link between the first node and the second node, transfers the first path setting information from the second node as a destination of the second path to the destination of the first path along the route of the first path, so that each node between the second node and the destination node on the route of the first path which has received the first path setting information conducts setting of its own node for setting the first path, thereby setting the first path.

10. A distributed control communication network formed of a plurality of links of different attributes, comprising path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein said path setting means transfers first path setting information from the transmission source node to the destination of the first path along the route of the first path, so that each node on the route of the first path which has received the first path setting information makes determination on setting of the second path, when determining that setting of the second path is not necessary, after conducting setting of its own node for setting the first path, transfers the first path setting information to an adjacent node on the route of the first path and when determining that setting of the second path is necessary, transfers second path setting information to an adjacent node on the route of the first path, so that each node on the route of the first path which has received the second path setting information conducts setting of its own node for the setting of the second path, thereby setting the second path between the first node and the second node, and after setting the second path between the first node and the second node, with the second path as a virtual link between the first node and the second node, transfers the first path setting information from the second node as a destination of the second path to the destination node of the first path along the first path, so that each node on the route of the first path between the second node and the destination node which has received the first path setting information conducts setting of its own node for setting the first path, thereby setting the first path.

11. A distributed control communication network formed of a plurality of links of different attributes, comprising path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein said path setting means transfers first path setting information from the transmission source node to the destination node of the first path along the route of the first path, so that each node on the route of the first path which has received the first path setting information makes determination on setting of the second path, when determining that setting of the second path is not necessary, after conducting setting of its own node for setting the first path, transfers the first path setting information to an adjacent node on the route of the first path and when determining that setting of the second path is necessary, discriminates the second node as a destination of the second path and transfers second path setting information from the first node as a transmission source of the second path to the second node as a destination along the route of the first path, so that each node on the route of the first path which has received the second path setting information conducts setting of its own node for the setting of the second path, thereby setting the second path between a first node and the second node, and simultaneously with the setting of the second path between the first node and the second node, with the second path as a virtual link between the first node and the second node, transfers the first path setting information from the second node as a destination of the second path to the destination node of the first path along the route of the first path, so that each node on the route of first path between the second node and the destination node which has received the first path setting information conducts setting of its own node for setting the first path, thereby setting the first path.

12. A distributed control communication network formed of a plurality of links of different attributes, comprising
- path setting means for, at the time of transferring communication data from a transmission source node to a destination node by using a first path, for the setting of the first path, setting a second path which can accommodate the first path in a section from a first node to a second node which are on the route of the first path and which manage a link whose attribute is different from an attribute of a link managed by the transmission source node, wherein
- said path setting means
- transfers first path setting information from the transmission source node to the destination node of the first path along the route of the first path, so that each node on the route of the first path which has received the first path setting information makes determination on setting of a second path, when determining that setting of the second path is not necessary, after conducting setting of its own node for setting the first path, transfers the first path setting information to an adjacent node on the route of the first path and when determining that setting of the second path is necessary, adds the first path setting information to second path setting information, transfers the second path setting information to an adjacent node on the route of the first path, so that each node on the route of the first path which has received the second path setting information conducts setting of its own node for the setting of the second path, thereby setting the second path between the first node and the second node, and
- with the second path in question as a virtual link between the first node and the second node, the second node as a destination of the second path which has received the second path setting information transfers the first path setting information added to the second path setting information from the second node as a destination of the second path to the destination node of the first path along the route of the first path, so that each node on the route of first path between the second node and the destination node which has received the first path setting information conducts setting of its own node for setting the first path, thereby setting the first path.

* * * * *